United States Patent [19]

Kato et al.

[11] 4,163,385

[45] Aug. 7, 1979

[54] ENGINE KNOCKING METER

[75] Inventors: Takayuki Kato, Aza; Kazumasa Sumi; Masanori Miyashita, both of Nagoya; Osamu Nomura, Heiwamachi; Shouzo Naito, Bisai, all of Japan

[73] Assignees: Kabushiki Kaisha Toyota Chuo Kenkyusho; Toyota Jidosha Kogyo Kabushiki Kaisha; Kabushiki Kaisha Tokai Rika Denki Seisakusho, all of Aichi, Japan

[21] Appl. No.: 811,207

[22] Filed: Jun. 29, 1977

[30] Foreign Application Priority Data

Jun. 30, 1976 [JP] Japan .................................. 51-77371

[51] Int. Cl.² ..................... G01M 15/00; G01N 33/22
[52] U.S. Cl. ...................................................... 73/35
[58] Field of Search .............................................. 73/35

[56] References Cited

U.S. PATENT DOCUMENTS

| 2,448,323 | 8/1948 | De Boisblanc | 73/35 |
| 2,534,276 | 12/1950 | Lancor | 73/35 |
| 2,619,830 | 12/1952 | Piety | 73/35 |
| 2,941,396 | 6/1960 | Adams | 73/35 |
| 3,286,164 | 11/1966 | Huff | 73/35 X |
| 3,324,711 | 6/1967 | Wostl | 73/35 |

Primary Examiner—James J. Gill
Attorney, Agent, or Firm—Koda and Androlia

[57] ABSTRACT

An engine knocking meter detects a pressure in a cylinder by a pressure sensor, clips a detected signal by a clipping circuit to cut low level noises, supplies an output signal of the clipping circuit to a filter circuit to eliminate noises having frequencies which lie beyond a frequency band of a knocking signal, and supplies an output signal of the filter circuit to a gate which is driven within a given crank angle under the control of a signal from a crank angle sensor mounted on a crank shaft of an engine, for separating the knocking signal.

11 Claims, 11 Drawing Figures

ENGINE KNOCKING METER

BACKGROUND OF THE INVENTION

1. Field of Invention

The present invention relates to an engine knocking meter for automatically measuring knocking which occurs during abnormal combustion condition of an engine.

2. Prior Art

It is important to determine knocking which occurs during abnormal combustion condition of an engine in measuring performance of the engine such as an ignition advance angle of the engine for improving the performance of the engine. As the trend of lead-free gasoline is enhanced, the measurement of knocking is essential. In the past, the measurement of knocking has been relied on an experienced person's listening to knocking sound by his ears. Although this method is superior in that the knocking can be determined without requiring any modification of the engine, it has disadvantages that slight change in knocking sound cannot be determined and the determination of the knocking is difficult under a big noise condition that occurs during high speed rotation of the engine. Methods for automatically measuring the knocking have also been proposed.

One method thereof uses an acceleration detection system. In this method, vibration conveyed through a rigid body of the engine is sensed by an acceleration meter to measure abnormal vibration due to the knocking. Although this method is somewhat superior to the above method of determining the knocking by human ears in that the former can automatically determine the knocking, it still has a disadvantage that a detection sensitivity greatly changes depending on a position at which the acceleration meter is mounted. Furthermore, under the high speed rotation condition of the engine, it is very difficult to distinguish the vibration of the engine per se from the vibration due to the knocking.

A second method applies a system for detecting a pressure within a combustion chamber. In this method, an engine pressure meter using a semiconductor strain gauge or the like is used to detect abnormal change in pressure due to the knocking which is superimposed on a combustion pressure signal of a cylinder. Although this method is advantageous in that the knocking can be precisely determined, it has a disadvantage that it is difficult to mount the engine pressure meter because of its characteristic and structure and hence the operability is poor. Furthermore, this method is expensive.

A third method applies a pressure sensing plug system. In this method, a washer portion of a spark plug is made of a piezoelectric transducer of ceramics so that a pressure applied to the spark plug is changed in accordance with the change of pressure within the cylinder, and the change in the pressure applied to the plug is detected as an electrical signal by piezoelectric effect of the piezoelectric transducer of ceramics. This method is relatively effective because no modification of the engine is required since the piezoelectric element is of small size and it can be readily mounted or detached and it is cheap. However, this method has a drawback that undesired noises such as noises due to engine vibration or ignition noises are introduced in the knocking signal because the piezoelectric element in nature has a very high output impedance of the order of $10^9 \Omega$ or higher and hence the ignition noises are greatly introduced and the vibration of the engine is readily picked up. It has a disadvantage of small S/N ratio particularly when the engine is rotating at a high speed.

All of the prior art methods described above have advantages as well as disadvantages and they are not satisfactory in achieving ideal determination of the knocking.

FIGS. 1A and 1B show waveforms of electrical signals representative of pressures in the cylinder detected by the pressure sensing spark plug. FIG. 1A shows a combustion pressure waveform detected under normal combustion condition while FIG. 1B shows a combustion pressure waveform detected under abnormal combustion condition where knocking is occurring in the engine. In FIGS. 1A and 1B, reference character A denotes a signal indicative of a pressure waveform in the cylinder, reference character B denotes a signal indicative of ignition noise waveform, reference character C denotes a signal indicative of abnormal pressure waveform due to the knocking, reference character D denotes a signal indicative of noise waveform due to the operation of a contact point, and reference character E denotes a signal of vibration noise waveform caused by mechanical vibration noise of the engine.

As seen from FIGS. 1A and 1B, the pressure detecting signal includes complex and various noises, and an S/N ratio between the engine knocking signal and other noises is very low.

SUMMARY OF THE INVENTION

It is an object of the present invention to provide an engine knocking meter which is capable of detecting a pressure within the cylinder as an electrical signal and separating only a knocking signal out of the detected electrical signal.

It is other object of the present invention to provide an engine knocking meter which is capable of measuring the knocking independently of the type of sensor for detecting the pressure in the cylinder.

In order to achieve the above objects, the engine knocking meter of the present invention comprises a first means for detecting the pressure in the cylinder, a second means for picking up only those signal components of a detected pressure signal of the first detecting means which lie within a frequency band of a knocking signal, a crank angle sensor having at least two portions thereof mounted to a crank shaft for detecting crank angles corresponding to a beginning and a termination of a knocking region, a third means responsive to a detection signal of the crank angle sensor to produce a gate signal, a gate means for receiving a pressure signal from the second means and the gate signal from the third means to gate only that pressure signal which exists in the knocking region, a fourth means comprising a peak holding circuit for holding a peak value of a signal gated from the gate means for each ignition cycle, and a fifth means responsive to a peak hold signal from the fourth means to detect knocking condition.

The first means may be single, or a plurality of such means may be arranged depending on the number of cylinders of the engine. When a plurality of such means are provided, it is preferable to provide a summing means for summing the signals from the detecting means on a time axis to supply a summed signal to the second means.

The second means eliminates noises having frequencies which are beyond the frequency band of the knocking signal. The period of the engine knocking signal is determined by a repetition time of shock waves in the cylinder produced by the occurence of knocking, and the repetition time is substantially constant for a given inner diameter of the cylinder. Accordingly, the knocking signal has a frequency band inherent to a particular type of the engine. In the existing engines such as automobile engines, it is in the range between approximately 7 KHz and 10 KHz. The amplitude of the knocking signal changes in substantially proportional to the strength of knocking and it is in the range of several dozens of milli-volts to several hundreds of milli-volts for the waveforms shown in FIGS. 1A and 1B. On the other hand, the period of the combustion pressure signal is considered to be in the range of approximately several dozens of Hz to several hundreds of Hz although it varies with the rotation speed of the engine. The ignition noise and the contact point noise have frequency components of 10 KHz or higher. The engine vibration noise which superimposes over the entire range of the pressure signal has a very wide range of frequency components. Accordingly, in order to pick up only the knocking signal from the pressure signal on which those complex noises are superimposed, it is preferable that a pass band of the second means is selected between 7KHz and 10KHz.

It is desirable that the signal from the crank angle sensor comprises two signals, one for opening the gate means and the other for closing the gate means. In response to the open signal and the close signal, the third means produces the gate signal, so that the gate signal is generated at a constant crank angle independently of the rotation speed of the engine.

The gate means receives the gate signal from the third means to open the gate at the given range of crank angle to gate the pressure signal supplied from the second means. The pressure signal detected by the first means includes many noises such as engine vibration noise and electrical noise which have the same frequency components as the knocking signal. Furthermore, because of the nature of the engine knocking, the knocking signal occurs in a given range of crank angle after a top dead center of the crank angle. Accordingly, it is possible to separate only the knocking signal by the gate means by opening the gate in an appropriate range of the crank angle. As a result, the various noises which are randomly introduced in the pressure signal can be eliminated by the gate means and only the knocking signal can be separated.

The fourth means may comprise a peak holding circuit which holds the peak value of the signal from the gate means for each ignition cycle. Where the pressure signals of the respective cylinders are summed on the time axis, it is preferable that the fourth means holds the signals for each ignition cycle of each cylinder.

The fifth means for detecting the knocking condition may be a combination of a low pass filter and an analog detector. Alternatively, it may comprise means for separating those signal components of the knocking signal which are above a predetermined level by a level discriminating means and counting and indicating the separated signal components for a predetermined number of ignition cycles. By the function of the gate means, some of the noises can be eliminated, but the pressure signal gated by the gate means still includes the engine vibration noise components which are introduced because they occurred at the same time as the knocking signal. Accordingly, in order to separate the knocking signal from the engine vibration noise, the level discriminating means detects those pressure signal components which are above the vibration noise components which uniformly occur at a fixed engine rotation speed, as the knocking signal. Since the engine vibration noise increases in proportion to the rotation speed of the engine, the level for discriminating the knocking signal should be changed in proportion to the rotation speed of the engine.

In addition to the means described above, the following means are preferably used.

Impedance converting means: The output impedance of the piezoelectric element is very high as described above. Accordingly, it is necessary to provide with an impedance converting means for making matching between such a piezoelectric element and the signal processing system such as noise elimination means. The impedance converting means may be a voltage follower circuit using an operational amplifier or an input circuit using a field effect transistor.

Amplitude adjusting means: Several types of sensor for detecting the pressure in the cylinder may be available. When a plurality of sensors which are equal in number to the number of the cylinders of the engine are used, it is difficult to use the plurality of sensors having the same detection sensitivity. Particularly when the pressure sensing ignition plugs type sensors are used, the sensitivities of the sensors greatly vary depending on clamping torques at the mounts to the cylinders. Thus, if the pressure signals from the sensors of different sensitivities are used without compensation, a large error may be introduced in the measurement. The variation in the sensitivity can be compensated by adjusting the output signals from the pressure sensors mounted to the respective cylinders by amplifier circuits having variable amplification factor. Thus, the amplitude adjusting means play an important role in precisely measuring the knocking of the engine.

Clipping means: Where the plurality of pressure sensor are used, it is an economical way to process the pressure signals including the knocking signals supplied from the respective sensors by a common electrical circuit for the purpose of simplification. The process may be summing process on different time axis. As a result, since each of the pressure signals includes various noise signals over entire time axis, the addition of the plurality of pressure signals results in the addition of the noise components as well. This reduces the S/N ratio. In order to avoid such inconvenience, it is desirable to provide a clipper for each of the pressure signals from the respective sensor. Since the level of the pressure signal including the knocking signal lies within a predetermined range, proper clipping of the pressure signal can be attained by appropriately establishing a clipping level.

Selector switch means: For the engine having a plurality of cylinders, the plurality of pressure sensors are mounted to the respective cylinders and the output signals from the respective pressure sensors are summed to process the sum signal in a single electrical circuit. By connecting selector switch means to the output signals from the pressure sensors, one for each cylinder, before they are summed, the measurement of the knocking for each of the cylinders and for the entire cylinder can be selectively made. Thus, the selector switch means facilitate the detection of a particular cylinder in which knocking is occurring.

DESCRIPTION OF THE PREFERRED EMBODIMENT

Figure 2:
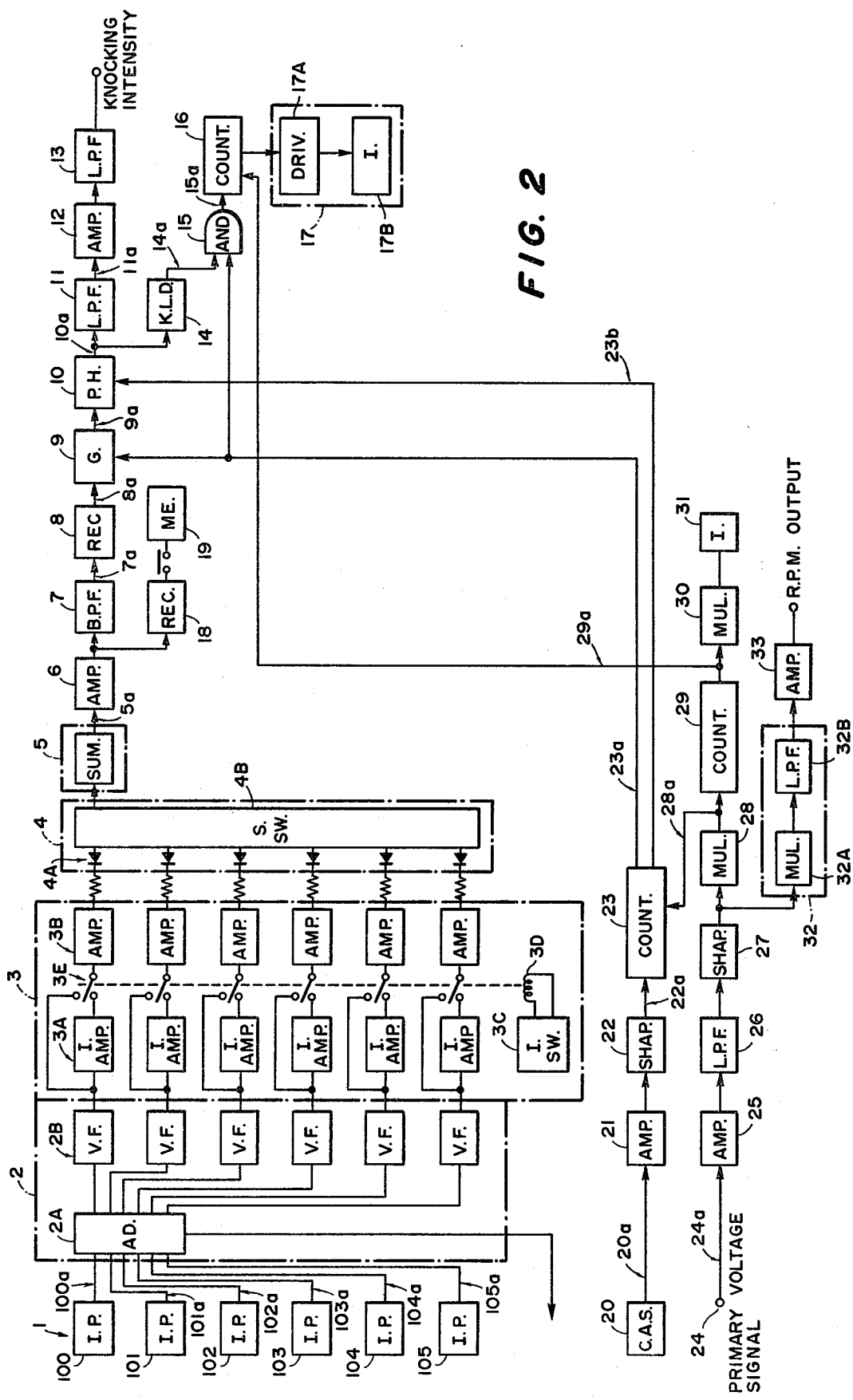
FIG. 2 shows a block diagram of one embodiment of an engine knocking meter of the present invention.
Figure 3:
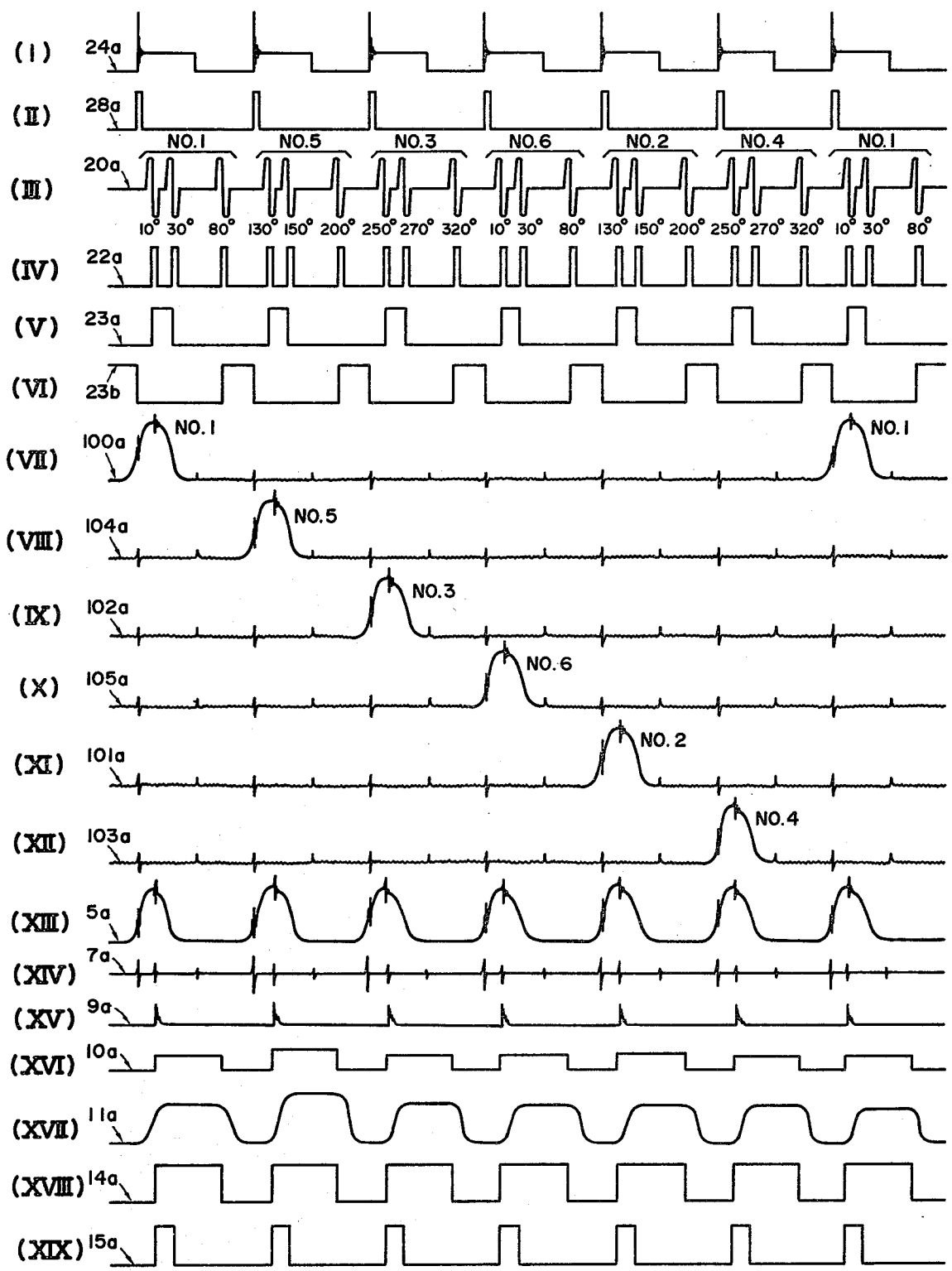
FIG. 3 shows waveforms at various points in the circuit of FIG. 2.

Various engines such as four-cylinder engine or six-cylinder engine are employed in automobiles. In the following explanation, an embodiment of an engine knocking meter for the six-cylinder engine is described. FIG. 2 shows a block diagram of one embodiment of the present invention and FIG. 3 shows waveforms at various points in the circuit of FIG. 2.

In FIG. 2, a group of pressure sensing ignition plugs 1 comprise pressure sensing ignition plugs 100, 101, 102, 103, 104 and 105 mounted one to each of cylinders. The pressure sensing ignition plugs 100, 101, 102, 103, 104 and 105 detect pressures in corresponding cylinders during combustion and produce pressure signals 100a, 101a, 102a, 103a, 104a and 105a shown in FIG. 3 (VII)~(XII), respectively.

An impedance converter circuit 2 comprises an adaptor 2A and a plurality of voltage follower circuits 2B, and it receives the pressure sure signals 100a, 101a, 102a, 103a, 104a, and 105a as inputs thereto and carries out impedance conversion for piezoelectric elements of the pressure sensing spark plugs.

An amplitude adjusting circuit 3 comprises a plurality of inverting amplifiers 3A, amplifiers 3B, an inverting switch 3C, a coil 3D adapted to be excited by an output signal of the inverting switch 3C and a plurality of switches adapted to be turned on and off by the coil 3D. It has an amplitude adjusting function to receive six output signals of the impedance converting circuit 2 and to level-adjust the received signal to the same level and an inverting amplification function to select polarities of the pressure signals 100a to 105a supplied from the pressure sensing spark plugs.

A clipping circuit 4 comprises a plurality of diodes 4A and a selector switch 4B. The selector switch 4B functions to transmit the gain adjusted signals of the respective cylinders of the engine separately or all of the signals simultaneously while the diodes 4A function to cut signals which are smaller than a predetermined signal level to enhance the S/N ratio of the gain adjusted signals.

A summing circuit 5 has a function to produce total sum of the six clipped signals to produce an output signal 5a shown in FIG. 3 (XIII).

An amplifier circuit 6 has a function to amplify the output signal 5a of the summing circuit 5 at a constant amplification degree.

A band pass filter circuit 7 receives an output of the amplifier circuit 6 and eliminates those frequency components of the received signal which do not lie in a predetermined frequency band. In the illustrated embodiment, the pass band is between 7KHz and 10KHz.

An output signal 7a of the band pass filter circuit 7 is shown in FIG. 3(XIV).

A half-wave rectifying circuit 8 receives the output signal 7a of the band pass filter circuit 7 and amplifies only positive signal components thereof.

A gate circuit 9 functions to eliminate those engine vibration noise and electrical noise in the pressure signal which have the same frequency components as the knocking signal. It receives an output signal 8a of the half-wave rectifying circuit 8 and separates the output signal 8a by a gate signal 23a supplied from a counter circuit 23. The gate signal 23a is shown in FIG. 3(V) and comprises pulse signals having a given crank angle duration. The gate signal 23a is derived by amplifying a crank angle signal 20a from a crank angle sensor 20 by an amplifier circuit 21, pulse-converting an output of the amplifier 21 by a shaping circuit 22 and applying an output signal 22a of the shaping circuit 22 to the counter circuit 23. A signal 24a from a primary voltage sensor 24 of an ignition coil is shaped to produce a clear signal 28a, which is applied to the counter 23 to clear the counter operation.

The crank angle sensor 20 is an electromagnetic pickup which can sense the crank angle of the engine in non-contact manner. It detects the crank angle by a crank angle disc mounted on a crank shaft of the engine. The crank angle signal detected is shown in FIG. 3(III). The detected signal 20a from the crank angle sensor 20 is amplified by the amplifier circuit 21 and shaped by the shaping circuit 22 to produce the pulse signal 22a, which is shown in FIG. 3(IV).

The counter circuit 23 receives the output signal 22a of the shaping circuit 22 and the clear signal 28a (which is derived by amplifying the primary voltage signal 24a by an amplifier circuit 25, applying an output signal of the amplifier circuit 25 to a low pass filter 26 to eliminate high frequency components included in the primary voltage signal 24a, pulse-converting an output of the low pass filter 26 by a shaping circuit 27 and triggering a monostable multivibrator circuit 28 by a rise of an output pulse of the shaping circuit 27 to produce the signal 28a), and produces a gate signal 23a and a reset signal 23b which is applied to a peak holding circuit 10. The primary voltage signal 24a is shown in FIG. 3(I), the clear signal 28a is shown in FIG. 3(II) and the reset signal 23b is shown in FIG. 3(VI).

The timing of the occurrence of the knocking lies near 10° to 30° from the top dead center of the crank angle as described above. Accordingly, the gate signal 23a of the counter circuit 23 has a duration corresponding to the phase of 10° to 30°. It is known that the timing of the occurrence of the knocking lies in substantially constant range of the crank angle independently of the rotation speed of the engine. Accordingly, by setting the duration of the gate signal 23a derived from the crank angle signal 20a to correspond to the crank angle of 10° to 30°, the gate signal 23a of the constant crank angle can be produced irrespective of the change of the rotation speed of the engine.

An output signal 9a of the gate circuit 9 is applied to the peak holding circuit 10. The output signal 9a is shown in FIG. 3(XV).

The peak holding circuit 10 receives the output signal 9a of the gate circuit 9 and functions to hold a peak value of the output signal 9a. The holding period is determined by the reset signal 23b supplied from the counter circuit 23. More particularly, the peak holding circuit 10 holds the peak value, which is then reset by the reset signal 23b. Thus, the holding period extends from the start of hold to the occurrence of the reset signal. A circuit for generating the reset signal 23b is now explained.

Figure 4A:
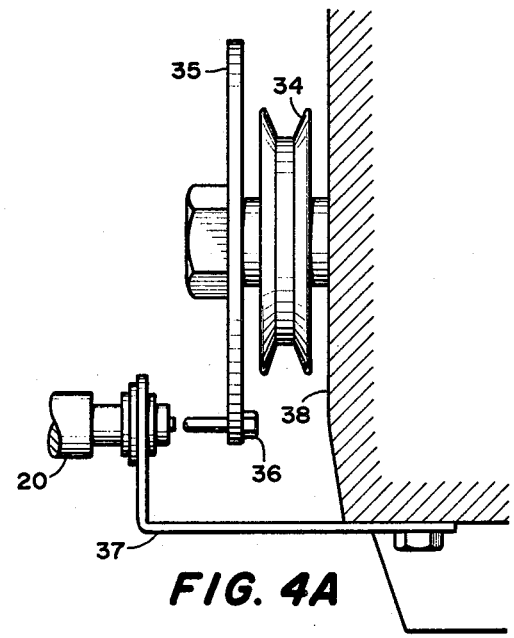
FIGS. 4A, 4B and 4C show an embodiment of a crank angle sensor which constitutes a principal part of the present invention.
Figures 4B, 4C:
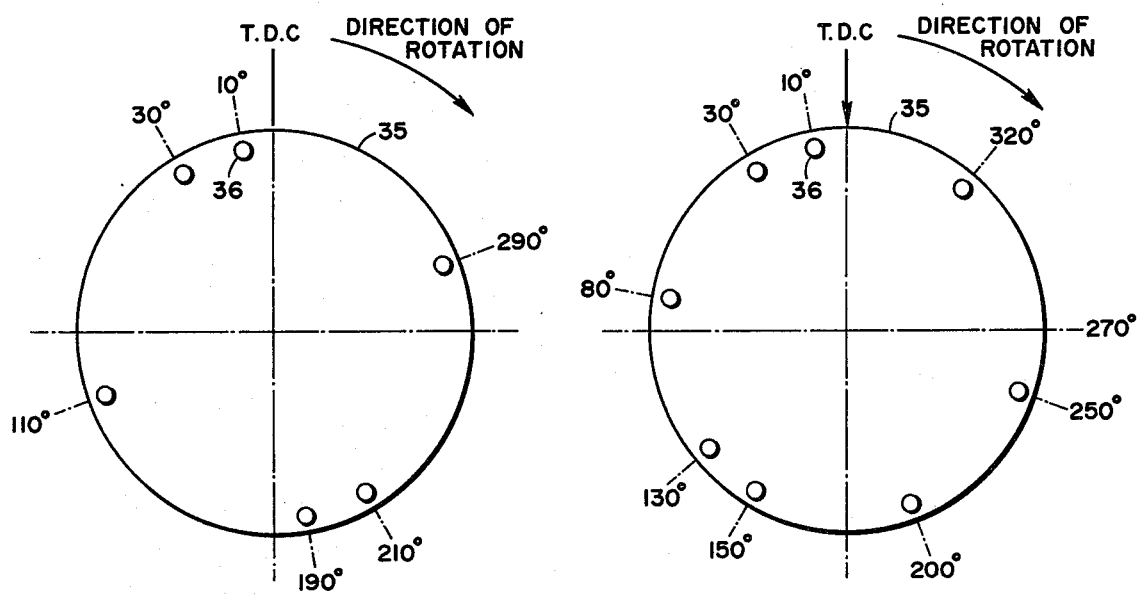

As stated above, the crank angle signal 20a is derived by a crank angle disc 35 made of aluminum which is mounted on a crank pulley 34 attached to a main body 38 of the engine as shown in FIG. 4A, pins 36 of magnetic material attached to the disc 35 at predetermined crank angle positions and the crank angle sensor 20 of an electromagnetic pickup type supported by a stay 37. FIG. 4B shows an example of the setting of the pins 36 for a four cylinder engine and FIG. 4C shows that for a six-cylinder engine. As shown in FIG. 4C are the settings for the setting pins 36 for a six cylinder engine. The setting pins are arranged at 10°, 30°, 80°, 130°, 150°, 200°, 250°, 270° and 320°. The crank angle signal 20a derived by the pins 36 is shown in FIG. 3(IV). It has three pulses for each of the cylinders of the engine. The signal 20a is divided to the gate signal 23a and the reset signal 23b by the counter circuit 23. More particularly, for — signal for a first cylinder shown in FIG. 3(III, IV), when the signal 22a is applied to the counter 23 which is reset to zero by the clear signal 28a, the gate signals 23a are produced by the 10° and 30° crank angle signals, and the reset signals 23b are produced by the 80° crank angle signal and the clear signal 28a. In a similar manner, in sequence of the ignition of the six cylinder engine, the gate signals and the reset signals for the fifth, third, sixth, second and fourth cylinders are produced. The output signal 10a of the peak holding circuit 10 which is reset by the reset signals 23a is shown in FIG. 3(XVI).

The output signal 10a of the peak holding circuit 10 is supplied to a low pass filter 11 which functions to eliminate harmonics of the signal 10a. An output signal 11a of the low pass signal 11 is shown in FIG. 3(XVII).

The output signal 11a of the low pass filter 11 is applied to an amplifier circuit 12 which amplifies the received signal 11a to an appropriate signal level and applies the amplified signal to a low pass filter 13 which converts the received signal to a signal having an appropriate constant. An output signal of the low pass filter 13 is a signal representative of knocking intensity which is indicated by an analog meter or a recorder.

A knocking level discriminating circuit 14 receives the peak hold output signal 10a of the peak hold circuit 10 to determine whether the knocking signal is above a predetermined level or not, and it produces a pulse signal 14a when the knocking signal is above the predetermined level. The pulse signal 14a is shown in FIG. 3(XVIII). An AND gate 15 performs logical AND function of the output pulse signal 14a of the level discriminating circuit 14 and the gate signal 23a from the counter circuit 23. An output signal 15a of the AND gate 15 indicates the occurrence of the knocking. The output signal 15a is shown in FIG. 3(XIX).

A counter 16 sequentially counts up the pulses from the AND gate 15. It has a clearing system to clear the content of the counter by an output signal of a counter 29 to be described later. An indication circuit 17 comprises a driver circuit 17A and an indication unit 17B, and it indicates the content of the counter 16, that is, the frequency of the knocking signals occurred during a given number of ignition cycles.

The clear signal 29a for clearing the counter 16 is derived by shaping the primary voltage signal 24a, applying the shaped signal to the monostable multivibrator circuit 28 to produce the clear signal 28a having the given duration, and counting the clear signals 28a by the counter circuit 29, which produces the clear signal 29a when it counts up a predetermined number of clear signals 28a More particularly, the counter circuit 29 produces an output pulse signal each time the engine is ignited 100 times, to clear the counter 16. Thus, the counter 16 indicate the frequency of the occurrence of the knocking during 100 times of ignition of the engine.

The primary voltage signal 24a is pulse-converted by the shaping circuit 27 and the pulse signal from the shaping circuit 27 is applied to a frequency-voltage converter circuit 32 comprising a monostable multivibrator 32A and a low pass filter 32B, to convert the pulse signal to a D.C. signal of a level which is proportional to the number of pulses. An output signal of the frequency-voltage converter circuit 32 is applied to an amplifier circuit 33 which amplifies the received signal to an appropriate level. An output signal of the amplifier circuit 33 is a D.C. signal proportional to the rotation speed of the engine, which is indicated by an appropriate meter or a recorder as the indication of the rotation speed of the engine. The pulse signal produced by the counter circuit 29 for each 100 times of ignition is applied to a monostable multivibrator circuit 30, which convert the received signal to a pulse of a given duration, which is applied to an indicator 31 such as light emitting diodes.

The output signal of the amplifier circuit 6 is also applied to a half-wave rectifying circuit 18, an output of which is indicated by a meter 19 to indicate a level of signal produced by the pressure sensing spark plugs.

The features and functions of the components of the illustrated embodiment have been described together with certain interrelations thereof. The overall operation is now explained. The description is simplified in order to avoid the duplication of the above explanation.

In the illustrated embodiment which is applied to the six-cylinder engine (the cylinders being designated as No. 1, No. 2, No. 3, No. 4, No. 5 and No. 6), the ignition and combustion proceed in the sequence of No. 1, No. 5, No. 3, No. 6, No. 2, No. 4, -, for example. Assuming that the pressure sensing spark plugs 100, 101, 102, 103, 104, and 105 are mounted in the No. 1, No. 2, No. 3, No. 4, No. 5 and No. 6 cylinders, respectively, the pressure sensing spark plugs produce the pressure signals 100a, 101a, 102a, 103a, 104a, and 105a as shown in FIG. 3(VII), (XI), (IX), (XII), (VIII) and (X), respectively. The pressure signals 100a, 101a, 102a, 103a, 104a and 105a are applied to the impedance converter circuit 2, which impedance-converts the high impedance of the piezoelectric elements and applies the converted output signals to the amplitude adjusting circuit 3. As shown in FIG. 2, the six signals are applied in parallel so that the amplitude adjusting circuit 3 adjusts the levels (gains) of the pressure signals for the respective cylinders individually. The output signals of the amplitude adjusting circuit 3 is applied to the clipping circuit 4 having the predetermined clipping level Vc to eliminate the signals of the levels lower than the predetermined level Vc. The output signals of the clipping circuit 4 are applied to the summing circuit 5 through the switches arranged one for each cylinder, to sum the received signals. Since the addition in the summing circuit 5 is carried out on the time axis, the sum signal is produced for each ignition cycle. The output signal of the summing circuit 5, that is, the sum signal 5a is shown in FIG. 3(XIII).

The output signal 5a of the summing circuit 5 is amplified by the amplifier circuit 6 and the amplified signal is applied to the band pass filter circuit 7, which passes only those frequency components which lie between 7KHz and 10KHz and eliminates other frequency components. Thus, the band pass filter circuit 7 produces the signal 7a shown in FIG. 3(XIV), which primarily consists of the knocking signal including noises having frequency components which lie in the pass band. The output signal 7a is applied to the half-wave rectifying circuit 8 which converts the signal 7a to a signal of positive components only, which signal is applied to the gate circuit 9. The gate signal 23a [shown in FIG. 3(V)] of the counter circuit 23 is applied to the gate circuit 9 as a control input thereto. Accordingly, the gate circuit 9 gates the signal 7a while the gate signal 23a is positive. The gate signal 23a is produced in the following manner.

The crank angle signal 20a derived by the pins 36 arranged on the crank angle disc 35 shown in FIG. 4C and the crank angle sensor 20 is applied to the circuit including the amplifier circuit 21, the shaping circuit 22 and the counter circuit 23, to which the clear signal 28a derived from the primary voltage signal 24a through the circuit including the amplifier circuit 25, the low pass filter circuit 26, the shaping circuit 27 and the monostable multivibrator circuit 28 is applied to produce the gate signal 23a, which is applied to the control input of the gate circuit 9.

The signal 9a produced by the gate circuit 9 is shown in FIG. 3(XV). The signal 9a is applied to the peak holding circuit 10 which hold the peak value. The signal held by the peak holding circuit 10 is reset by the signal 23b from the counter circuit 23. The reset signal 23b is produced for each ignition cycle of the engine in synchronism therewith. The reset signal 23b is shown in FIG. 4(VI).

The peak signal 10a held in the peak holding circuit 10 is processed by the low pass filter circuit 11, the amplifier circuit 12 and the low pass filter circuit 13 to produce the signal indicative of the knocking intensity. This signal is indicated by the meter of recorder to indicate the knocking intensity. The output signal 10a of the peak holding circuit 10 is also applied to the knocking level discriminating circuit 14 to determine whether the knocking signal above the predetermined level exists. When the knocking signal above the predetermined level exists, the knocking level discriminating circuit 14 produces the output pulse, which is applied to the AND gate 15 together with the gate signal 23a of the counter circuit 23 which is produced in proportion to the number of times of the ignition. As a result, the AND gate 15 produces the pulse signals the number of which corresponds to the number of times of the occurrence of the knocking. These pulse signals are applied to the counter 16 which counts up the pulse signals. The content of the counter 16 is displayed by the indication unit 17. The content of the indication indicates the number of the knocking signal occurred during the given number of ignition cycles, that is, the frequency of knocking.

In the above embodiment, the pressure sensing ignition plugs 1 may be substituted by other means. For example, the acceleration sensors or engine pressure meters may be used. The same is true for the electromagnetic pickup. As an example, a slit disc is attached to a drive shaft of the engine and the crank angle of the engine is detected by a photo-electric pickup to detect the crank angle signal near the crank angle at which the engine knocking occurs. The detected signal may be applied to the gate circuit 9 as the gate signal thereto.

The above embodiment is now explained in further detail.

Figure 5:
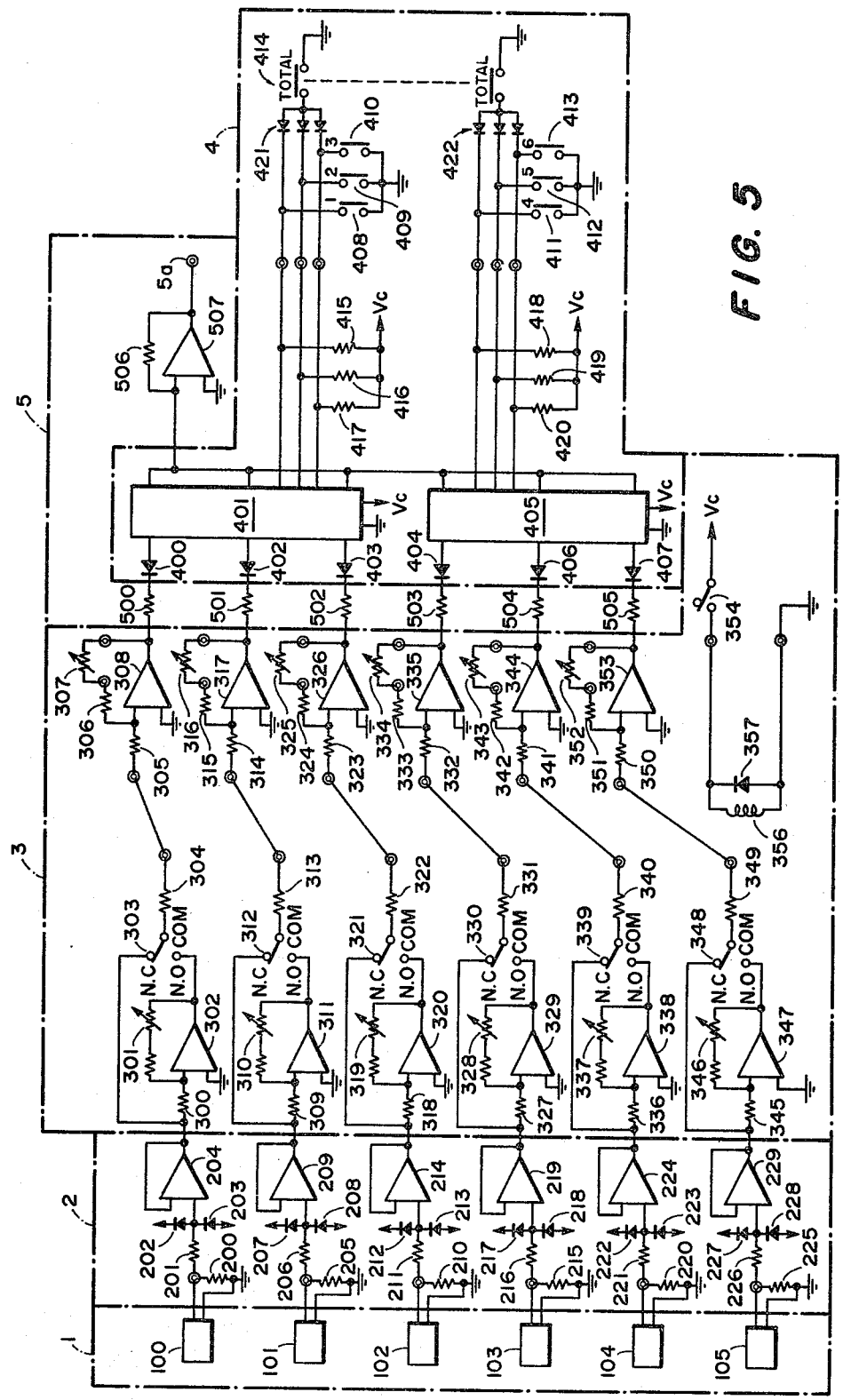
FIGS. 5, 6, 7 and 8 show further details of the portions of the circuit shown in FIG. 2.

FIG. 5 shows a specific circuit configuration of the group of pressure sensing ignition plugs 1, the impedance converting circuit 2, the amplitude adjusting circuit 3, the clipping circuit 4, the selector switches 4B and the summing circuit 5. The impedance converting circuit 2 has an impedance converting element for each of the pressure sensing ignition plugs 100, 101, 102, 103, 104 and 105. Each of the impedance converting elements is of the same construction. The impedance converting element for the pressure sensing ignition plugs 100 includes resistors 200 and 201, diodes 202 and 203 and an operational amplifier 204. Similarly, the impedance converting elements for the pressure sensing ignition plugs 101, 102, 103, 104 and 105 include resistors 205 and 206, diodes 207 and 208 and an operational amplifier 209; resistors 210 and 211, diodes 212 and 213 and an operational amplifier 214; resistors 215 and 216, diodes 217 and 218 and an operational amplifier 219; resistors 220 and 221, diodes 222 and 223 and an operational amplifier 224; and resistors 225 and 226, diodes 227 and 228 and an operational amplifier 229; respectively. Since the functions of the respective inpedance converting elements are identical, only the impedance converting element for the pressure sensing ignition plugs 100 is explained below.

The resistor 200 is connected between two output terminals (positive and negative) of the pressure sensing ignition plugs 100. One end of the resistor 200 is grounded while the other end of the resistor 200 is connected to one input terminal of the operational amplifier 204 through the resistor 201. The operational amplifier 204 has another input terminal to which an output terminal of the operational amplifier 204 is directly connected. The resistor 200 and the operational amplifier 204 constitute a voltage follower circuit. The resistor 201 and the diodes 202 and 203 function as a noise limitter to limit abnormal noise such as ignition noise. The arrows shown at one ends of the diodes 202 and 203 indicate that bias voltages are applied thereto. The bias voltage is set in accordance with the noise level. With this arrangement, the voltage follower circuit performs the impedance conversion and the noise limitter eliminate the predetermined noise. The output signals from the operational amplifiers 204, 209, 214, 219, 224 and 229 are applied to the amplitude adjusting circuit 3.

The amplitude adjusting circuit 3 includes inverting operational amplifiers, polarity switches and amplitude adjusting operational amplifiers, each corresponding to respective one of the output signals of the operational amplifiers 204, 209, 214, 219, 224 and 229. The amplitude adjusting circuit 3 for the operational amplifier 204 includes resistors 300, 301, 304, 305, 306 and 307, operational amplifiers 302 and 308 and a switch 303. Similarly, the amplitude adjusting circuits 3 for the operational amplifiers 209, 214, 219, 224 and 229 respectively include resistors 309, 310, 313, 314, 315 and 316, amplifiers 311 and 317 and a switch 312; resistors 318, 319, 322, 323, 324 and 325, amplifiers 320 and 326 and a switch 321; resistors 327, 328, 331, 332, 333 and 334, amplifiers 329 and 335 and a switch 330; resistors 336, 337, 340, 341, 342 and 343, amplifiers 338 and 344 and a switch 339; and resistors 345, 346, 349, 350, 351 and 352, amplifiers 347 and 353 and a switch 348. Since the functions of the respective circuits are identical, only the amplitude adjusting circuit for the operational amplifier 204 is explained below. The resistor 300 is connected to an output terminal of the operational amplifier 204. The other end of the resistor 300 is connected to one input terminal of the operational amplifier 302 and to an output terminal of the amplifier 302 through the resistor 301. The other input terminal of the amplifier 302 is grounded. The output terminal of the amplifier 204 is directly connected to a normally close (N.C.) contact of the switch 303. The output terminal of the amplifier 302 is directly connected to a normally open (N.O.) contact of the switch 303. When the output signal of the pressure sensing spark plug 100 is of positive polarity, the N.C. contact of the switch 303 is connected to a common (COM) contact so that the output signal of the operational amplifier 204 is directly applied to the resistor 304 in the succeeding stage. When the output signal of the pressure sensing spark plug 100 is of negative polarity, an inverter switch 354 is closed to activate a relay 356 so that the N.O. contact of the switch 303 is connected to the COM contact and the N.C. contact is disconnected from the COM contact. Accordingly, the negative polarity output signal of the operational amplifier 204 is inverted by the inverting amplifier 302 and the positive polarity signal is applied to the resistor 304 through the N.O. contact and the COM contact. In this manner, the polarity of the output signal of the pressure sensing spark plug 100 is selectively inverted by the inverting amplification function such that the signals of a given polarity are applied to the succeeding stage.

The resistor 304 is connected to the resistor 305, which is connected to one input terminal of the operational amplifier 308 and to an output terminal of the amplifier 308 through resistors 306 and 307. The other input terminal of the amplifier 308 is grounded. The resistor 307 is a potentiometer which, in the illustrated embodiment of the engine knocking meter, is mounted on a front instrument panel to enable outside operation for adjustment. The positive polarity signal supplied from the preceeding stage through the COM contact of the switch 303 is amplified by the operational amplifier 308 at a desired amplification factor. The amplification factor is determined by a ratio of the resistor 305 to the resistors 306 and 307, and it is variable by adjusting the resistor 307. Accordingly, the variation in the sensitivity of the pressure sensing ignition plugs 100 can be compensated by the amplitude adjusting circuit 3. Similarly, for the pressure sensing ignition plugs 101, 102, 103, 104 and 105, the variations in the sensitivities thereof can be adjusted by the amplitude adjusting circuits 3 of the same construction so that the signals of uniform amplitude are produced at the output terminals of the respective amplitude adjusting circuits 3. This function is very important in matching the amplitude levels of the output signals of the pressure sensing ignition plugs the sensitivities of which vary over wide range as is well known, and it is one of essential means in accurately measuring the engine knocking.

The output terminals of the respective amplitude adjusting circuit 3 are connected to input resistors of the summing circuit 5. Since the clipping circuit 4 and the selector switch 4B are connected between the input resistors of the summing circuit 5 and the input resistors of the summing circuit 5 and the input terminals of the summing operational amplifiers, the clipping circuit 4 and the selector switch 4B are first explained. The output terminal of the operational amplifier 308 is connected to a cathode terminal of a diode 400 of the clipping circuit 4 through a resistor 500. An anode terminal of the diode 400 is connected to one switch input terminals of an electronic switch 401 of the selector switch 4B, and an output terminal of the electronic switch 401 is connected to an input terminal of an operational amplifier 507 of the summing circuit 5. Similarly, an output terminal of the operational amplifier 317 is connected to a resistor 501 and through a diode 402 to a second input terminal of the electronic switch 401, and output terminal of which is connected to the input terminal of the summing circuit 5.

An output terminal of the operational amplifier 326 is connected to a resistor 502 and through a diode 403 to a third input terminal of the electronic switch 401, and output terminal of which is connected to the input terminal of the summing circuit 5.

An output terminal of the operational amplifier 335 is connected to a resistor 503 and through a diode 404 to a first input terminal of an electronic switch 405, an output terminal of the summing circuit 5.

An output terminal of the operational amplifier 344 is connected to a resistor 504 and through a diode 406 to a second input terminal of the electronic switch 405, an output terminal of which is connected to the input terminal of the summing circuit 5.

An output terminal of the operational amplifier 353 is connected to a resistor 505 and through a diode 407 to a third input terminal of the electronic switch 405, an output terminal of which is connected to the input terminal of the summing circuit 5.

Since the clipping circuits 4 and the selector switches 4B corresponding to the operational amplifiers 308, 317, 326, 335, 344 and 353 are of the common construction, the operation of only the clipping circuit 4 and the selector switch 4B connected to the output terminal of the operational amplifier 308 is explained below. Those signal component of a negative polarity signal produced by the operational amplifier 308 which are below the operation voltage of the diode 400 are eliminated. As is well known, when the diode 400 is a silicon diode, the operation voltage is approximately 0.7 volts. And when the diode is a gelumanium diode, the operation voltage is approximately 0.4 volts. The applied signal is limited in accordance with the operation voltage of the diode. This function is very important in summing a plurality of signals, particularly when signals including noises are summed only the signal components above a predetermined level are added together to improve an S/N ratio of signals.

The diode 400 produces a negative signal above the predetermined level, which is applied to the first input terminal of the electronic switch 401 of the selector switch 4B. The electronic switch 401 is turned on or off by the operation of a switch 408. A path between the first input terminal of the electronic switch 401 and the output terminal thereof is normally broken so that the output signal form the diode 400 is not applied to the summing circuit 5. When the switch 408 is pressed, the first input terminal and the output terminal of the electronic switch 401 are connected together so that the input signal is applied to the summing circuit 5.

Similarly, when a switch 409 is pressed, the second input terminal and the output terminal of the electronic switch 401 are connected so that the output signal of the diode 402 is applied to the summing circuit 5.

When a switch 410 is pressed, the third input terminal and the output terminal of the electronic switch 401 are connected so that the output signal of the diode 403 is applied to the summing circuit 5.

When a switch 411 is pressed, the first input terminal and the output terminal of the electronic switch 405 are connected so that the output signal of the diode 404 is applied to the summing circuit 5.

When a switch 412 is pressed, the second input terminal and the output terminal of the electronic switch 405 are connected so that the output signal of the diode 406 is applied to the summing circuit 5.

When a switch 413 is pressed, the third input terminal and the output terminal of the electronic switch 405 are connected so that the output signal of the diode 407 is applied to the summing circuit 5.

In this manner, by the individual functions of the selector switch 4B, the output signals from the pressure sensing spark plugs 100, 101, 102, 103, 104, and 105 mounted in the respective cylinders are selected to allow the selective application of the individual signals to the summing circuit 5. Thus, the measurement of the knocking for each of the cylinders of the engine is facilitated by the function of the selector switch 4B. When it is desired to apply all of the signals of the respective cylinders to the summing circuit 5, a switch 414 which is a push bottom mounted on the front panel is pressed so that the all of input terminals and the output terminals of the electronic switches 401 and 405 are connected together to allow the measurement of the knocking for all of the cylinders.

First contacts of the switches 408, 409, 410, 411, 412 and 413 for actuating the electronic switches 401 and 405 are connected to control input terminals of the electronic switches 401 and 405, to which bias voltages are also applied through resistors 417, 416, 415, 420, 419 and 418. Second terminals of the switches 408, 409, 410, 411, 412 and 413 are grounded. The switch 414 is of double type and first terminals thereof are connected to the control input terminals of the electronic switches 401 and 405 through diodes 421 and 422 while second terminals of the switch 414 are grounded.

The output terminals of the electronic switches 401 and 405 are connected to a common input terminal of an operational amplifier 507 of the summing circuit 5, which includes input resistor 500, 501, 502, 503, 504 and 505, and a resistor 506 connected between the common input terminal and an output terminal of the amplifier 507. The summing circuit 5 sums the signals produced from the respective cylinders to produce a sum output or it produces output signals for individual cylinders.

Figure 6:
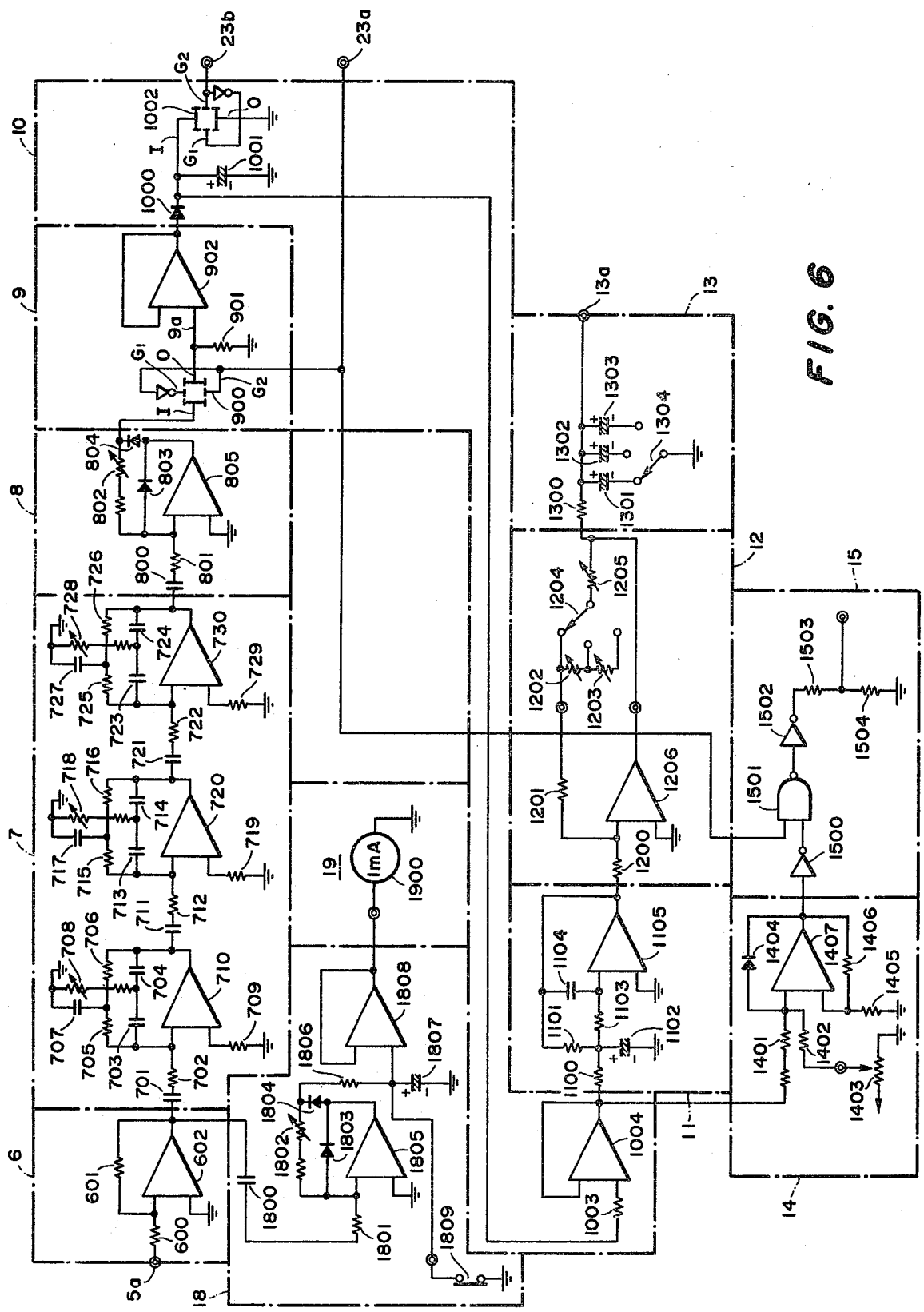

Referring now to FIG. 6, configurations and interconnections of the amplifier circuit 6, the band pass filter circuit 7, the half-wave rectifying circuit 8, the gate circuit 9, the peak holding circuit 10, the low pass filter circuit 11, the amplifier circuit 12, the low pass filter circuit 13, the knocking level discriminating circuit 14 and the AND gate 15 are explained.

The output terminal of the summing circuit 5 is connected to an input terminal of an operational amplifier 602 of the amplifier circuit 6 through a resistor 600. The input terminal of the amplifier 602 is connected to an output terminal thereof through a resistor 601. Another input terminal of the operational amplifier 602 is grounded. Thus, the resistor 600 serves as an input resistor of the operational amplifier 602 while the resistor 601 serves as a feedback resistor, with an amplification factor of the amplifier being determined by a ratio of the resistors 600 and 601.

The output signal from the output terminal of the summing circuit 5 is amplified by the amplifier circuit 6 with a given amplification factor to produce an output at an output terminal thereof.

The output terminal of the amplifier circuit 6 is connected to the band pass filter circuit 7 through a capacitor 701. The band pass filter circuit 7 comprises a first band pass filter circuit including capacitors 701, 703, 704 and 707; resistor 702, 705, 706, 708 and 709 and an operational amplifier 710, a second band pass filter circuit including capacitors 711, 713, 714 and 717, resistors 712, 715, 716, 718 and 719 and an operational amplifier 720, and a third band pass filter circuit including capacitors 721, 723, 724 and 727, resistors 722, 725, 726, 728 and 729 and an operational amplifier 730. Since the constructions and the interconnections of the first, second and third circuits are identical, the construction of only the first circuit is explained below.

The output terminal of the amplifier circuit 602 is connected to the capacitor 701, and through the resistor 702 to an input terminal of the operational amplifier 710. The input terminal of the operational amplifier 710 is connected to an output terminal thereof through the capacitors 703 and 704 and the resistors 705 and 706. The junction of the capacitors 703 and 704 is grounded through the resistor 708, and the junction of the resistors 705 and 706 is grounded through the capacitor 707.

Figure 1A:
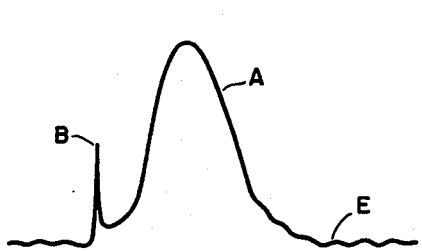
FIG. 1A and 1B show waveforms illustrating pressure signals detected by pressure sensing ignition plugs.
Figure 1B:
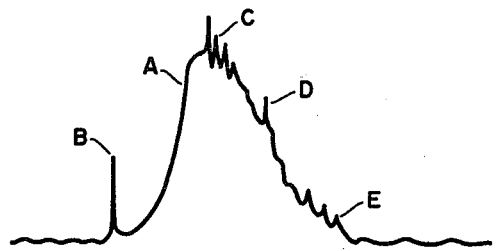

In the above arrangement, the combination of the capacitors 703 and 704 and the resistor 708 forms a high pass filter circuit and the combination of the resistors 705 and 706 and the capacitor 707 forms a low pass filter circuit, and those are combined to form the band pass filter 7 comprising the three stages of band pass filter circuit. As stated above, the pressure signals 100a, 101a, 102a, 103a, 104a and 105a produced by the pressure sensing ignition plugs 100, 101, 102, 103, 104 and 105 include the abnormal pressure signals due to the knocking as well as the noise signals, i.e., the pressure signals in the cylinders, the ignition noise signals, the operation noise signals at points and the engine vibration noise signals, as shown in FIG. 1B. Since the frequency of the abnormal pressure signal due to the knocking is different from the frequencies of other noise signals, the frequency components of other noise signals can be eliminated by the band pass filter circuit 7. As stated above, the frequency of the abnormal pressure signal due to the knocking lies in the range of approximately 7KHz to 10KHz, accordingly, by designing the band pass filter circuit 7 having a lower cutoff frequency of 7KHz and an upper cutoff frequency of 10KHz with a sharp attenuation characteristic, the undesired frequency components which lie below 7KHz and above 10KHz are fully eliminated. Thus, the band pass filter circuit 7 in the knocking meter of the present invention may have the lower cutoff frequency of 7KHz and the upper cutoff frequency of 10KHz, the center frequency of 8.5 KHz and an attenuation value of − 50 dB/oct. In this manner, the noise components are eliminated at a high efficiency.

An output terminal of the operational amplifier 730 in the third circuit of the band pass filter circuit 7 is connected to the half-wave rectifying circuit 8 in the succeeding stage.

The half-wave rectifying circuit 8 comprises a capacitor 800, resistors 801 and 802, diodes 803 and 804 and an operational amplifier 805. The output terminal of the operational amplifier 730 of the band pass filter circuit 7 is connected to the capacitor 800 and to an input terminal of the operational amplifier 805 through the resistor 801. The input terminal of the operational amplifier 805 is connected to an output terminal thereof through the resistor 802, the diode 804 and the diode 803. Another input terminal of the operational amplifier 805 is grounded. The half-wave rectifying circuit thus constructed functions to supply only positive components of the A.C. abnormal pressure signal due to the knocking supplied from the band pass filter circuit 7 in the preceding stage. It also functions as an amplifier having an amplification factor determined by a ratio of the resistors 801 and 802. The purpose of the half-wave rectifying circuit 8 is to provide the function of inhibiting undesired negative polarity signal from being applied to the gate circuit 9 in the succeeding stage and the function of amplifying the abnormal pressure signal due to the knocking supplied from the band pass filter circuit 7 to convert it to a signal having a sufficient amplitude to allow subsequent processing in the succeeding electrical circuits.

The gate circuit 9 comprises a gate element 900 including a C-MOS circuit, a resistor 901 and an operational amplifier 902. The junction of the resistor 802 and the diode 804 of the half-wave rectifying circuit 8 is connected to an input terminal I of the gate element 900 of the gate circuit 9. An output terminal 0 of the gate element 900 is grounded through the resistor 901 and also directly connected to an input terminal of the operational amplifier 902. Another input terminal of the operational amplifier 902 is directly connected to an output terminal thereof. Gate control terminals $G_1$ and $G_2$ of the gate element 900 are connected to an output terminal of the counter circuit 23 to be described later. With this arrangement, the gate element 900 has a switching function while the operational amplifier 902 has a voltage follower function.

The operation of the gate circuit 9 is now explained. The output signal of the half-wave rectifying circuit 8 is applied to the input terminal I of the gate element 900 as an input signal thereto while the output signal 23a of the counter circuit 23 is applied to the gate control terminals $G_1$ and $G_2$ as a gate signal thereto. The gate element 900 responds to those two signals to function as an analog switch. The output signal 9a is produced at the output terminal 0 of the gate element 900. The gate signal 23a applied to the gate control terminals serves to pick up the signal occurring during the knocking and it has a timing as shown in FIG. 3. Accordingly, only the signal derived from the half-wave rectifying circuit while the gate signal 23a is positive is produced as the output signal 9a.

The output signal 9a of the gate element 900 is impedance-converted by the voltage follower circuit comprising the operational amplifier 902 and thence applied to the peak holding circuit 10 of the succeeding stage. The purpose of the gate circuit 9 is that since the noise components lying in the frequency band of the band pass filter circuit 7, that is, the noise components having the same frequencies as the abnormal pressure signal due to the knocking are distributed over the entire time axis, the gate circuit 9 gates the signal during only when the abnormal pressure signal due to the knocking exists and eliminates the noise components included in the other time axis. When the gate circuit 900 is not opened, an input impedance of the succeeding peak holding circuit 10 is infinite and the undesired noise may be possibly introduced thereto. Accordingly, the voltage follower circuit comprising the operational amplifier 902 is provided to reduce the impedance between the gate element 900 and the peak holding circuit 10. The output of the gate circuit 9 is taken out of the output terminal of the operational amplifier 902 and applied to the peak holding circuit 10 as an input signal thereto.

The peak holding circuit 10 comprises a diode 1000, a capacitor 1001, an operational amplifier 1004, a gate element 1002 and a resistor 1003. A gate control terminal of the gate element 1002 receives the output signal 23b of the counter circuit 23 to be described later. An output terminal 0 of the gate element 1002 is grounded and an input terminal thereof is connected to a cathode terminal of the diode 1000.

The output terminal of the operational amplifier 902 of the gate circuit 9 is connected to an anode terminal of the diode 1000 while the cathode terminal thereof is connected to an input terminal of the operational amplifier 1004 through the resistor 1003. The cathode terminal of the diode 1000 is also grounded through the capacitor 1001.

Another input terminal of the operational amplifier 1004 is directly connected to an output terminal thereof. The operation of the peak holding circuit 10 thus constructed is explained below.

The positive polarity of abnormal pressure signal due to the knocking supplied from the output terminal of the gate circuit 9 is stored in the capacitor 1001 through the diode 1000 during the non-conduction state of the gate element 1002. Since the input impedance of the operational amplifier 1004 has been set as great as infinitely great, the capacitor 1001 stores the signal until its peak value without discharging the signal. The peak value of the signal thus stored in the capacitor 1001 is held until the gate element 1002 conduct to short the capacitor 1001, when the stored signal is applied to the output terminal of the operational amplifier 1005. In this manner, the peak holding function is attained. The reset signal 23b supplied from the counter 23 to be described later is applied to the control input terminal of the gate element 1002 to reset the peak holding circuit 10.

An output terminal of the peak holding circuit 10 extends from the ouput terminal of the operational amplifier 1004. The output 23b of the counter circuit 23 applied to gate control terminals G1 and G2 of the gate element 1002 provides the reset function to the peak holding circuit 10, and the output terminal of the peak holding circuit 10 is connected to the low pass filter circuit 11 and the knocking level discriminating circuit 14.

The low pass filter circuit 11 comprises resistors 1100, 1101 and 1103, capacitors 1102 and 1104 and an operational amplifier 1105. The output terminal of the operational amplifier 1004 of the peak holding circuit 10 is connected to the resistor 1100 and to an input terminal of the operational amplifier 1105 through the resistor 1103. The junction of the resistors 1100 and 1103 is grounded through the capacitor 1102 and to an output terminal of the operational amplifier 1105 through the resistor 1101. The input terminal of the operational amplifier 1105 is connected to the output terminal thereof through the capacitor 1104. Another input terminal of the operational amplifier 1105 is directly grounded. When the peak value signal of the abnormal pressure signal due to the knocking supplied from the peak holding circuit 10 is applied to the resistor 1100 of the low pass filter circuit 11, the low pass filter circuit 11 eliminates higher harmonic components from the output signal of the peak holding circuit 10 to convert the applied signal to a smooth sinusoidal wave signal.

The amplifier circuit 12 comprises resistors 1200, 1201, 1202, 1203 and 1205, a switch 1204 and an operational amplifier 1206. The output terminal of the operational amplifier 1105 of the low pass filter circuit 11 is connected to an input terminal of the operational amplifier 1206 through the resistor 1200. The input terminal of the operational amplifier 1206 is connected to an output terminal thereof through the resistor 1201, the switch 1204 and the resistor 1205. Depending on a particular contact position of the switch 1204, the resistor 1202 or 1203 is connected between the resistors 1201 and 1205. Another input terminal of the operational amplifier 1206 is grounded. The amplifier circuit 12 thus constructed functions to amplify the signal 11a supplied from the low pass filter circuit 11 and also functions to select the amplification degree by the switch 1204.

The low pass filter circuit 13 comprises a resistor 1300, capacitors 1301, 1302, and 1303 and a switch 1304. The output terminal of the operational amplifier 1206 of the amplifier circuit 12 is connected to the resistor 1300 and the other end of the resistor 1300 is connected to the switch 1304 through the capacitors 1301, 1302 and 1303. A common contact of the switch 1304 is grounded. The low pass filter circuit 13 thus constructed is effective when the signal supplied from the amplifier circuit 12 is recorded by a recorder such as a pen recorder. More particularly, since an upper limit of the frequency response of the pen recorder is 1Hz to 2Hz, when the period of the abnormal pressure signal due to the knocking is short (that is, when strong knocking occurs), the response of the pen recorder is so deteriorated that an exact output signal is not recorded.

In order to avoid the above inconvenience, a time constant circuit including the resistor 1300 and the capacitors 1301, 1302 and 1303 is provided to change the time constant of the switch 1304 depending on the period of the output signal received. In this manner, the output signal can be exactly recorded. Thus, the output signal of the low pass filter circuit 13 is a knocking intensity signal indicative of the intensity of knocking.

The knocking level discriminating circuit 14 comprises a resistor 1401 to which the output signal of the peak holding circuit 10 is applied, a voltage dividing resistor 1403 having one end thereof connected to a voltage supply to produce a divided voltage, a resistor 1402 connected in series to receive the divided voltage of the dividing resistor 1403, an operational amplifier 1407 having an input terminal thereof connected to a junction of the resistors 1401 and 1402, a diode 1404 connected between an output terminal of the amplifier 1407 and the input terminal thereof, a feedback resistor 1406 connected between another input terminal of the amplifier 1407 and the output terminal thereof and a resistor 1405 connected to the second input terminal of the amplifier 1407 and ground, those components forming a zero crossing type Schmidt circuit.

The operation of the knocking level discriminating circuit of the construction described above is explained below. As stated above, the pressure signals 100a, 101a, 102a, 103a, 104a and 105a supplied from the pressure sensing spark plugs 100, 101, 102, 103, 104 and 105 include the abnormal pressure signals due to the knocking, which are to be detected, as well as certain other noises. It has been explained that most of those noises are eliminated by the functions of the clipping circuit 4, the band pass filter circuit 7 and the gate circuit 9. However, those components which occur in the same time period as the abnormal pressure signal due to the knocking and have the same frequency spectra as the abnormal pressure signal are not eliminated by the functions of the above circuits and the output signal from the peak holding circuit 10 includes such noise components. Although those noise components are very small and also included in the knocking intensity signal, they can be distinguished from the knocking signal in the pen recorder by the amplitude and the waveform of the signal to be recorded. However, when the presence or absence of the knocking is represented by the frequency of knocking by converting signals to pulses, the noise components must be eliminated. Otherwise, erroneous count by the noises would be included in the indication of the frequency of knocking. In order to prevent those noise components from being converted to pulse signals indicative of the frequency of knocking, the knocking level discriminating circuit 14 is provided. The output signal supplied from the peak holding circuit 10 is of positive polarity. Thus, a negative potential is applied to the voltage dividing resistor 1403 and the resistor 1402 such that the level discriminating circuit 14 operates only when a signal having a larger level then the negative potential applied to the resistor 1402 is applied to the resistor 1401. Accordingly, by setting the negative potential to a level corresponding to the level of the noise components, the level discriminating circuit 14 operates to respond to only the knock signal.

When the level of the noise components changes with the rotation speed of the engine, the setting of the voltage dividing resistor 1403 may be changed in accordance with a particular rotation speed of the engine. In this manner, by adjusting the voltage level by the voltage dividing resistor 1403 and changing the applied knocking signal to a pulse signal only when it is above the preset voltage level, the discrimination of knocking level is performed.

The pulse output from the knocking level discriminating circuit 14 is applied to the AND gate circuit 15 together with the gate signal 23a supplied from the counter circuit 23 to be described later.

The AND gate circuit 15 comprises an inverter 1500, and AND gate 1501, an inverter 1502 and resistors 1503 and 1504. The output terminal of the operational amplifier 1407 of the knocking level discriminating circuit 14 is connected to an input terminal of the inverter 1500, an output terminal of which is connected to one input terminal of the AND gate 1501. The other input terminal of the AND gate 1501 receives the gate signal 23a from the counter 23 to be described later. An output terminal of the AND gate 1501 is connected to an input terminal of the inverter 1502, an output terminal of which is grounded through the resistors 1503 and 1504. The junction of the resistors 1503 and 1504 is connected to an output terminal of the AND gate circuit 15.

Figure 7:
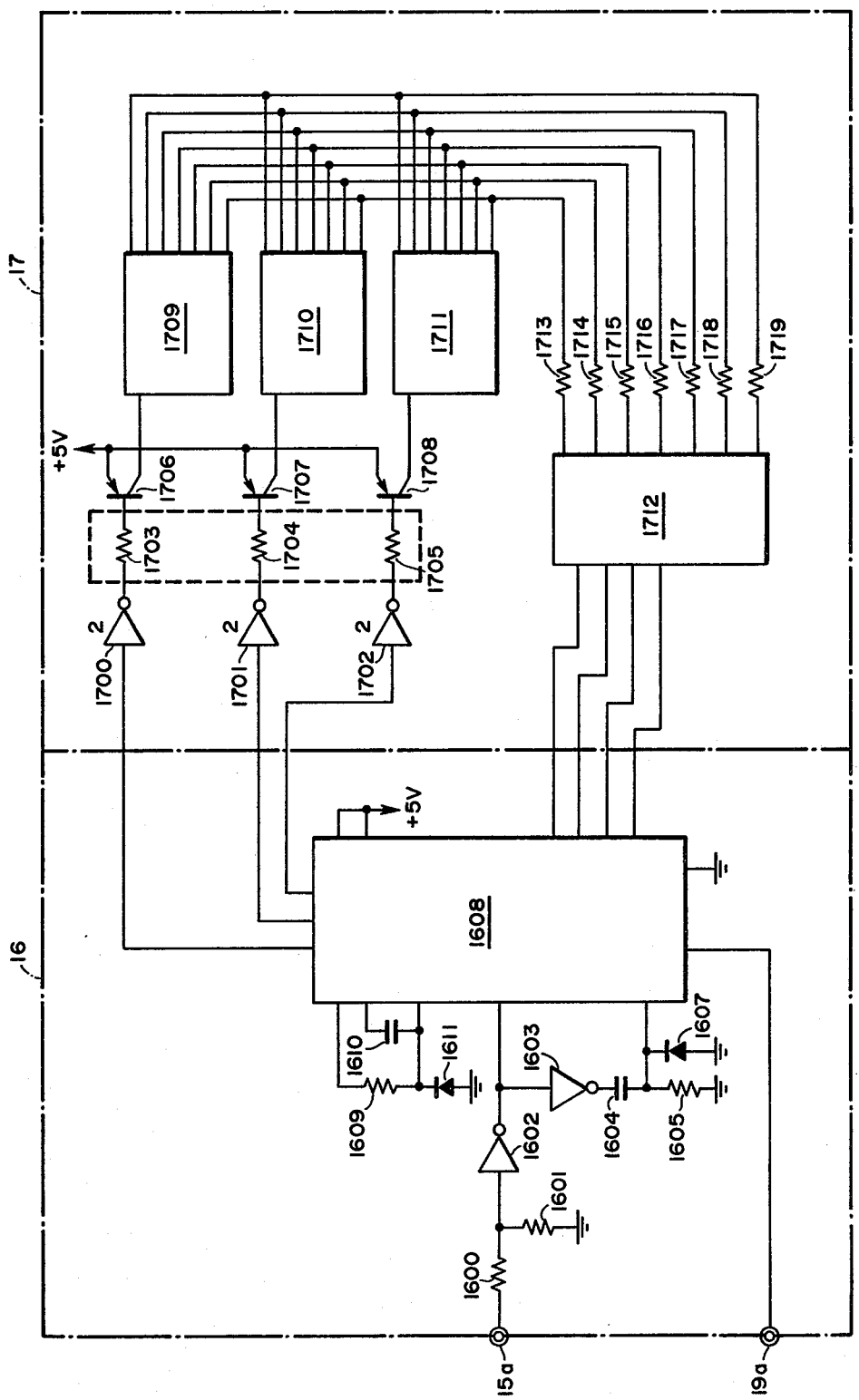

The AND gate circuit 15 performs a logical AND function of two input signals thereto and it produces a "1" output only when the gate signal and the knocking signal are coincidently present. Although the gate circuit 9 functions to separate only the knocking signal, a complex noise such as the ignition noise of the engine may be possibly introduced after the gate circuit 9. Accordingly, the AND gate circuit 15 is provided to discriminate the knocking signal which exists during the "1" state of the gate signal. The output signal from the AND gate circuit 15 is applied to the counter circuit 16 shown in FIG. 7. The counter circuit 16 and the indication circuit 17 are of conventional function. Therefore, the operation thereof is not explained here and only the construction thereof is explained below. The counter circuit 16 comprises resistors 1600, 1601, 1605 and 1609, capacitors 1604 and 1610, diodes 1607 and 1611, inverters 1602 and 1603 and a counter 1608. The indication circuit 17 comprises inverters 1700, 1701 and 1702, resistors 1703, 1704, 1705, 1713, 1714, 1715, 1716, 1717, 1718 and 1719, transistors 1706, 1707 and 1708, a decoder 1712 and displays 1709, 1710 and 1711. The counter circuit 16 receives the knocking signal 15a from the AND gate circuit 15 and the clear signal which is produced by the counter circuit 29 to be described later for each 100 times of ignition. As a result, the counter circuit 16 counts the number of times of the knocking occurred during 100 times of ignition. The content of the counter circuit 16 is indicated by the indication circuit 17 as a percent representation of the frequency of knocking.

As described above, the amplitude levels of the pressure signals from the pressure sensing ignition plugs 100, 101, 102, 103, 104 and 105 are adjusted by the potentiometers 307, 316, 125, 334, 343 and 352 of the amplitude adjusting circuit 3. The half-wave rectifying circuit 18 and the analog meter circuit 19 for indicating the signal levels by the meter is explained below.

In FIG. 6, the half-wave rectifying circuit 18 comprises capacitors 1800 and 1807, resistors 1801, 1802 and 1806, diodes 1803 and 1804, operational amplifiers 1805 and 1808 and a switch 1809. The output terminal of the operational amplifier 602 of the summing circuit 6 is connected to the input resistor 1801 of the half-wave rectifying circuit 18 through the capacitor 1800 and the other end of the resistor 1801 is connected to an input terminal of the operational amplifier 1805. The input terminal of the operational amplifier 1805 is connected to an output terminal thereof through a parallel circuit of a series circuit comprising the resistor 1802 and the diode 1804, and the diode 1803. The junction of the resistor 1802 and the diode 1804 is connected to an input terminal of the operational amplifier 1808 through the resistor 1806. Another input terminal of the operational amplifier 1805 is directly grounded. The input terminal of the operational amplifier 1808 is grounded through the capacitor 1807 and through the switch 1809. Another input terminal of the operational amplifier 1808 is directly grounded. In this arrangement, the operational amplifier 1805 performs the half-wave rectification function while the operational amplifier 1808 performs the holding function. The operation of the half-wave rectifying circuit 18 is explained below. When the pressure signals from the pressure sensing ignition plugs are to be adjusted to the same amplitude level by the amplitude adjusting circuit 3, the pressure signals of the respective cylinders are produced from the summing circuit 6 by the function of the selector switch 4B and the output from the summing circuit 6 is applied to the half-wave rectifying circuit 18 and hold therein. The analog meter 19 is connected to the output terminal of the operational amplifier 1808 to indicate the signal level of the applied signal. Accordingly, by sequentially operating the switches 408, 409, 410, 411, 412 and 413 of the analog switches 4a, the pressure signals for the respective cylinders can be adjusted to the same signal level by the amplitude adjusting circuit 3 while observing the analog meter 19.

Since hold circuit of the half-wave rectifying circuit 18, that is, the operational amplifier 1808 is designed to have a low input impedance, the hold circuit does not hold the input signal for a long time and a signal which varies in proportion with the amplitude level of the input signal is produced at the output of the operational amplifier 1808.

The switch 1809 is designed to be normally closed so that the input terminal of the operational amplifier 1808 is grounded and the signal level is not indicated by the analog meter 19. Only when the amplitude adjustment is to be carried out, the switch 1809 is opened to allow the indication of the input signal by the analog meter 19.

Figure 8:
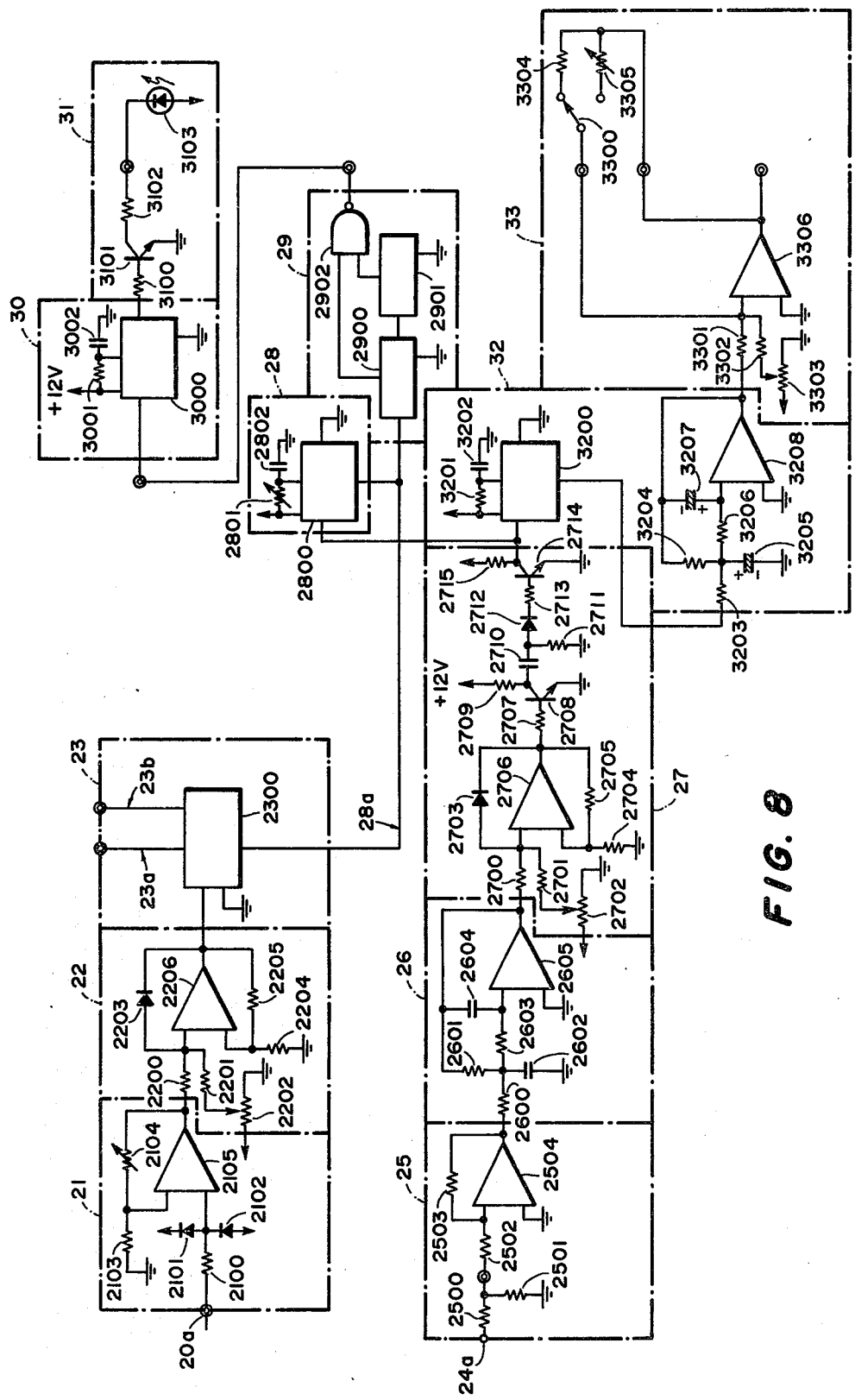

Referring now to FIG. 8, an electrical circuit diagram for generating the gate signal 23a to be applied to the gate circuit 9 and the AND gate circuit 15, the reset signal 23b to be applied to the peak holding circuit 10, the clear signal 29a to be applied to the counter circuit 16, and the engine rotation speed signal, respectively, is shown. A circuit for generating the gate signal 23a and the reset signal 23b from the crank angle signal 20a which is derived from the crank pulley of the engine shown in FIG. 4 with the aid of the crank angle disc 35, the pins 36 and the electromagnetic pickup 20, is first explained.

The output terminal of the electromagnetic pickup 20 is connected to an input resistor 2100 of the amplifier circuit 21. The amplifier circuit 21 comprises resistors 2100, 2103 and 2104, diodes 2101 and 2102 and an operational amplifier 2105. The resistor 2100 is connected to an input terminal of the operational amplifier 2105, to which input terminal the diodes 2101 and 2102 are connected to which a positive potential and a negative potential, respectively are applied. Another input terminal of the operational amplifier 2105 is grounded through the resistor 2103 and it is also connected to an output terminal thereof through the resistor 2104. Thus, an amplifier circuit is constructed with the resistor 2100 and the diodes 2101 and 2102 functioning to prevent a large noise from being applied to the operational amplifier 2105 and the operational amplifier 2105 has a given amplification factor determined by a ratio of the resistors 2103 and 2104.

An output of the amplifier circuit 21 is applied to the shaping circuit 22 where it is converted to a pulse. The shaping circuit 22 is the zero-crossing type Schmidt circuit comprising resistors 2200, 2201, 2202, 2204 and 2205, a diode 2203 and an operational amplifier 2206. The output terminal of the operational amplifier 2105 of the amplifier circuit 21 is connected to an input terminal of the operational amplifier 2206 through the resistor 2200. The resistor 2201 is connected to the input terminal of the operational amplifier 2206, and other end of the resistor 2201 is connected to an external potential source through the potentiometer 2202. The input terminal of the operational amplifier 2206 is further connected to an output terminal thereof through the diode 2203. Another input terminal of the operational amplifier 2206 is grounded through the resistor 2004 and to the output terminal thereof through the resistor 2205. The shaping circuit 22 of the construction described above converts the A.C. signal supplied from the amplifier circuit 21 to a series of pulse signals 22l.

The output signal 22a of the shaping circuit 22 is applied to the counter circuit 23.

The counter circuit 23 comprises a counterelement 2300 of IC structure. The output terminal of the operational amplifier 2206 of the shaping circuit 22 is connected to an input terminal (clock input terminal) of the counter element 2300 to apply the pulse signal 22a thereto.

Another input terminal (clear input terminal) of the counter element 2300 receives the clear signal 28a from the monostable multivibrator circuit 28 to be described later. The counter circuit 23 responds to those two input signals to produce the gate signal 23a and the reset signal 23b shown in FIG. 3 (V) and (VI), respectively. The gate signal 23a is applied to the gate control terminal of the gate circuit 9 and the AND gate circuit 15 while the reset signal 23b is applied to the gate control terminal of the peak holding circuit 10.

An electric circuit for detecting the primary voltage signal 24a from the primary winding of the ignition coil of the engine, and for producing the clear signal 28a, the signal 29a for clearing the counter circuit 16 and the engine rotation speed signal is not shown in drawings but will be explained hereinafter.

The primary voltage signal 24a derived by the clip 24 or the like from the primary winding of the ignition coil of the engine is applied to the amplifier circuit 25.

The amplifier circuit 25 comprises resistors 2500, 2501, 2502 and 2503 and an operational amplifier 2504. An output terminal of the clip 24 is connected to the resistor 2500 the other end of which is grounded through the resistor 2501. The junction of the resistors 2500 and 2501 is connected to an input terminal of the operational amplifier 2504 through the resistor 2502. The input terminal of the operational amplifier 2504 is connected to an output terminal thereof through the resistor 2503. In the amplifier circuit 25 thus constructed, the resistors 2500 and 2501 constitutes a voltage dividing circuit to divide the primary voltage signal 24a of approximately 300 volts peak-to-peak supplied from the primary winding of the ignition coil to produce a small level signal, which is applied to the input resistor 2502 of the amplifier circuit 25.

An output signal from the amplifier circuit 25 is applied to an input terminal of the low pass filter circuit 26 where high frequency components included in the primary voltage signal are eliminated. The low pass filter circuit 26 comprises resistors 2600, 2601 and 2603, capacitors 2602 and 2604 and an operational amplifier 2605. The output terminal of the operational amplifier 2504 of the amplifier circuit 25 is connected to the resistor 2600 the other end of which is connected to an input terminal of the operational amplifier 2605 through the resistor 2603. The junction of the resistors 2600 and 2603 is grounded through the capacitor 2602 and to an output terminal of the operational amplifier 2605 through the resistor 2601. The output terminal of the operational amplifier 2605 is connected to the input terminal thereof through the capacitor 2604. Another input terminal of the operational amplifier 2605 is directly grounded. The low pass filter circuit thus constructed converts the primary voltage signal including the high frequency components to a primary voltage signal consisting of only low frequency components. The primary voltage signal usually includes the high frequency components of approximately 10KHz and the low frequency components of several dozens of Hz to several hundreds Hz (which varies in proportion to the rotation speed of the engine). Thus, the low pass filter circuit 26 eliminates the high frequency components of approximately 10KHz.

An output signal from the low pass filter circuit 26 is applied to the shaping circuit 27 where it is converted to a series of pulse signals. The shaping circuit 27 comprises resistors 2700, 2701, 2702, 2704 and 2705, a diode 2703 and an operational ammplifier 2706, all of which constitute the zero-crossing type Schmidt circuit, and resistors 2707, 2709, 2711, 2713 and 2715, a capacitor 2710, a diode 2712 and transistors 2708 and 2714, all of which constitute a pulse conversion circuit. The output terminal of the operational amplifier 2605 of the low pass filter circuit 26 is connected to an input terminal of the operational amplifier 2706 through the resistor 2700 and the input terminal of the operational amplifier 2706 is connected to the resistor 2701 the other end of which is connected to an external potential source through the potentiometer 2702. The input terminal of the operational amplifier 2706 is further connected to an output terminal thereof through the diode 2703. Another input terminal of the operational amplifier 2706 is grounded through the resistor 2704 and to the output terminal thereof through the resistor 2705.

The zero-crossing type Schmidt circuit thus constructed functions to convert the applied primary voltage signal to a square wave signal. The output signal from the zero-crossing type Schmidt circuit is applied to the pulse conversion circuit through the resistor 2707. The output terminal of the operational amplifier 2706 of the zero-crossing type Schmidt circuit is applied to a base of the transistor 2708 through the resistor 2707. An emitter of the transistor 2708 is grounded while a collector thereof is connected to a power supply through the resistor 2709. The junction of the collector of the transistor 2708 and the resistor 2709 is connected to the capacitor 2710 the other end of which is grounded through the resistor 2711. The junction of the capacitor 2710 and the resistor 2711 is connected to a base of the transistor 2714 through a series circuit of the diode 2712 and the resistor 2713. An emitter of the transistor 2714 is grounded while a collector thereof is connnected to the power supply through the resistor 2715. With the above arrangement, the square wave signal of the primary voltage signal 24a supplied from the zero-crossing type Schmidt circuit, which is the inversion of the signal 24a, is inverted by an inverting circuit comprising the resistor 2707 and 2709 and the transistor 2708 to produce a signal which is of the same polarity as the signal 24a, and the resulting square wave signal is differentiated by a differentiation circuit comprising the capacitor 2710 and the resistor 2711 and only a rising edge of the differentiated signal, that is, a positive polarity signal is passed through the diode 2712 to the resistor 2713, which signal is then amplified by the transistor 2714 to the saturation to produce a narrow pulse signal.

The narrow pulse signal at the rising edge of the primary voltage signal 24a from the shaping circuit 27 is then applied to the monostable multivibrator circuit 28 and the frequency-voltage conversion circuit 32.

The monostable multivibrator circuit 28 comprises an IC element 2800, a resistor 2801 and a capacitor 2802, and it converts the pulse signal supplied from the collector of the transistor 2714 of the shaping circuit 27 to a pulse signal of a given duration determined by a time constant of the resistor 2801 and the capacitor 2802. The resulting pulse signal of the given duration is, on one hand, applied to the counter circuit 23 as the clear signal 28a thereto and, on the other hand, applied to the counter circuit 29 as the clock signal thereto. The counter circuit 29 comprises IC counter elements 2900 and 2901 and an AND gate 2902 and it counts up the output signal from the monostable multivibrator circuit 28. The counter circuit 29 produces a pulse from the AND gate 2902 for each 100 input pulse thereto. The output pulse of the counter circuit 29 is applied to the monostable multivibrator circuit 30, which comprises an IC element 3000, a resistor 3001 and a capacitor 3002 and converts the pulse signal supplied from the counter circuit 29 to a pulse signal of a given duration determined by a time constant of the resistor 3001 and a capacitor 3002. The resulting pulse signal is applied to the indicator circuit 31. The indicator circuit 31 comprises resistors 3100 and 3102, a transistor 3102 and a light emitting diode 3103. The output terminal of the monostable multivibrator circuit 30 is connected to a base of the transistor 3101 is grounded while a collector is connected to a cathode terminal of the light emitting diode 3103 through the resistor 3102, and an anode terminal of the light emitting diode 3103 is connected to the power supply.

With the above arrangement, each time the primary voltage signal 24a is applied a hundred times, the monostable multivibrator circuit 30 produces one pulse of the given duration to turn on the light emitting diode 3103.

The frequency-voltage conversion circuit (F-V conversion circuit) to which the output signal of the shaping circuit 27 is applied is now explained. The F-V conversion circuit 32 comprises a monostable multivibrator circuit including an IC element 3200, a resistor 3201 and a capacitor 3202, and a low pass filter circuit including resistors 3203, 3204 and 3206, capacitors 3205 and 3207 and an operational amplifier 3208.

The output signal from the collector of the transistor 2714 of the shaping circuit 27 is applied to an input terminal of the monostable multivibrator circuit, which converts the applied signal to a pulse signal of a given duration determined by a time constant of the resistor 3201 and the capacitor 3203. The resulting pulse signal is applied to the low pass filter circuit in the succeeding stage. The output terminal of the monostable multivibrator circuit is connected to the resistor 3203 the other end of which is connected to an input terminal of the operational amplifier 3208 through the resistor 3206. The junction of the resistors 3203 and 3206 is grounded through the capacitor 3205 and connected to an output terminal of the operational amplifier 3208 through the resistor 3204. The output terminal of the operational amplifier 3208 is connected to the input terminal thereof through the capacitor 3207. Another input terminal of the operational amplifier 3208 is directly grounded.

The low pass filter circuit thus constructed functions to convert the output signal from the shaping circuit 27 to a D.C. voltage an amplitude of which is proportional to the frequency of the input signal by the functions of the F-V conversion circuit 32 comprising the monostable multivibrator circuit and the low pass filter circuit. More particularly, the frequency of the primary voltage signal is converted to the D.C. voltage to produce the engine rotation speed signal.

The output signal of the F-V conversion circuit 32 is applied to the amplifier circuit 33, which comprises resistors 3301, 3302, 3303, 3304 and 3305, a selection switch 3300 and an operational amplifier 3306. The output terminal of the operational amplifier 3208 of the F-V conversion circuit 32 is connected to an input terminal of the operational amplifier 3306 through the resistor 3301. The input terminal of the operational amplifier 3306 is connected to the resistor 3302 the other end of which is connected to an external potential source through the potentiometer 3303. The input terminal of the operational amplifier 3306 is further connected to the selection switch 3300, contacts of which are connected to an output terminal of said operational amplifier 3306 through the resistors 3304 and 3305, respectively. Another input terminal of the operational amplifier 3306 is directly grounded.

The amplifier circuit 33 thus constructed functions to amplify the D.C. voltage signal proportional to the rotation speed of the engine supplied from the F-V conversion circuit 32 with an amplification degree determined by a ratio of the resistor 3301 and the resistor 3304 and 3305. The external potential source is applied to the operational amplifier 3306 through the potentiometer 3303 and the resistor 3303 and the resistor 3302 in order to adjust an offset voltage created by the operational amplifier 3208 in the preceding stage and the operational amplifier 3306 when the primary voltage signal is not applied, that is, when the rotation speed of the engine is zero, such that the output of the amplifier circuit 33 is adjusted to zero volt.

The selection switch 3300 is provided to select the number of cylinders of the engine, that is between four-cylinder engine and the six-cylinder engine, in the illustrated embodiment. The number of the primary voltage signals produced during one revolution of the engine for the four-cylinder engine and the six-cylinder engine are different, that is, it is two for the four-cylinder engine while it is three for the six-cylinder engine. Thus, for a given rotation number of the engine, the frequency of the primary voltage signal for the six-cylinder engine is 1.5 times as high as that for the four-cylinder engine. Accordingly, the level of the D.C. voltage produced by the F-V conversion circuit 32 is also 1.5 times as high as that for the four-cylinder engine. As a result, the output voltage of the amplifier circuit 33 differs depending on the number of cylinders at the given rotation speed of the engine. In order to compensate for the above difference, the selection switch 3300 is provided to switch the resistors 3304 and 3306, which are feedback resistors for the amplifier circuit 33 and selected to have resistances corresponding to the number of cylinders, such that the output of the amplifier circuit 33 always produces the D.C. voltage of a constant level at the given rotation speed of the engine irrespective of the number of cylinders.

While the above embodiment has been particularly shown and described in connection with the six-cylinder engine, it should be understood that the teaching of the present invention can equally be applied to the four-cylinder engine. Even a single cylinder engine may be used. In that case, the input circuit may be used as it is or it may be slightly modified (such as reduction in circuit). The pressure detection is not limited to the pressure sensing ignition plugs. The impedance conversion circuit is not always necessary depending on the nature of the sensor per se.

In accordance with the embodiment described above, the knocking of the engine can be quantatively detected and the content of the knocking, that is, the intensity and the frequency of the knocking can be simultaneously detected and indicated. Accordingly, accurate quantative measurement of the knocking is achieved. Further, since the processing is made fully electrically, remote control and remote measurement are facilitated and the determination of the knocking is considerably facilitated. The detection of the knocking over a wide rotation speed range of the engine from ideling state thereof to a high speed operation is possible, which aids to develop a way to scientific measurement of an engine performance. The measurement of the knocking of the individual cylinders of the engine is also facilitated.

Furthermore, the measurement of the knocking during transient aperation state of the engine is facilitated.

In addition, since the sensors can be readily mounted without requiring the modification of the engine, the detection of the knocking of the engine under any condition is possible by the operation of the knocking meter of the present invention.

What is claimed is:

1. An engine knocking meter comprising:
   a first means for detecting a combustion pressure signal based on pressure in cylinders of an engine;
   a second means for supplying those frequency components of said pressure signal which correspond to a predetermined frequency band of an engine knock signal, as a pressure signal.
   a crank angle sensor having at least a portion thereof mounted on a crank shaft above the engine for detecting a crank angle corresponding to a predetermined knocking region;
   a third means for producing a gate signal based on a detection signal from said crank angle sensor;
   a gating means responsive to said pressure signal from said second means and said gate signal from said third means to gate only that pressure signal which occurs during the presence of said gate signal;
   a fourth means for holding a peak value of a signal from said gating mens for each ignition cycle;
   a fifth means for detecting a knocking state from a peak hold signal from said fourth means, said fifth means including a level discriminating means for detecting the peak hold signal above a predetermined level as the knocking signal; and
   a means for counting said knocking signals above said predetermined level supplied from said level discriminating means for a period corresponding to a predetermined number of times of ignition and indicating the count.

2. An engine knocking meter according to claim 1, wherein said first means comprises pressure sensors mounted one for each of the cylinders of the engine for detecting the combustion pressure signals for the individual cylinders and further comprising a summing means for summing said pressure signals from said pressure sensors on a time axis and producing sum signals, said sum signals being applied to said second means.

3. An engine knocking meter according to claim 1 further including a clipping circuit for eliminating noise below a predetermined level from the pressure signal supplied from said first means.

4. An engine knocking meter comprising
   a first means for detecting a combustion pressure signal based on pressure in cylinders of an engine;
   a second means for supplying only those frequency components for said pressure signal which correspond to a predetermined frequency band of an engine knocking signal as a pressure signal;
   a crank angle sensor having at least a portion thereof mounted on a crank shaft of the engine for detecting a crank angle corresponding to a predetermined knocking region;
   a third means for producing a gate signal based on a detection signal from said crank angle sensor;
   a gating means responsive to said pressure signal from said second means and said gate signal from said third means to gate only that pressure signal which occurs during the presence of said gate signal;
   a fourth means for holding a peak value of a signal from said gating means for each ignition cycle;
   a fifth means for detecting a knocking state from a peak hold signal supplied from said fourth means;
   an impedence converting circuit for carrying out a pedence conversion for the pressure signal from the first means;
   an amplitude adjusting circuit for adjusting amplitude of the pressure signals supplied from the impedence converting circuit to compensate for the variation in the sensitivities of the first means;
   a clipping circuit for eliminating noises below predetermined level from the pressure signal supplied from the amplitude adjusting circuit.
   a selector switching means for selectively supplying pressure signals from the clipping circuit for each of the cylinders or supplying a total sum signal of the pressure signal;
   a summing circuit for producing total sum of the clipped signals;
   an amplifier circuit for amplifying the signal from the summing circuit at a constant amplification degree; and
   a half-wave rectifying circuit for receiving the signal of the second means and amplifying only positive signal components thereof.

5. An engine knocking meter according to claim 4, wherein
   said first means comprises piezo-electric elements attached to the spark plugs mounted to each of cylinders of engine for detecting pressures in corresponding cylinders during combustion and producing pressure signals,
   said second means comprises a band pass filter circuit for eliminating those frequency components of the signal which do not lie in a predetermined frequency band out of the signals from said amplifier circuit,
   said crank angle sensor is an electromagnetic pick up which detects a crank angle at which the engine knocking occurs, by a crank angle disc mounted on a crank pulley attached to the engine and pins of magnetic material attached to the disc at predetermined crank angle positions,
   said third means comprises an amplifier circuit, a shaping circuit and the counter circuit for producing a gate signal having a given crank angle duration from a detection signal of said crank angle sensor,
   said gating means comprises a gate circuit for receiving the gate signal supplied from the third means to open the gate at the given range of crank angle to gate the pressure signal supplied from the half-wave rectifying circuit and separate only the knocking signal,
   said fourth means comprises a peak holding circuit for holding a peak value of the signal supplied from the gating means, and
   said fifth means comprises means for detecting knocking intensity which comprises a low pass filter for adjusting time-constant of the signal from the fourth means and an analog detector for indicating the signal from the low-pass filter as knocking intensity, and means for detecting the frequency of the knocking which comprises a level discriminating means for detecting the peak hold signal above a predetermined level as the knocking signal, AND gate for producing the pulse signals the number of which corresponds to the number of times of the occurrence of the knocking, the counter for counting up the pulse signals, and the indication unit for indicating the frequency of the knocking signals during the given number of ignition cycles.

6. An engine knocking meter according to claim 4 wherein said fifth means includes a low pass filter for adjusting time-constant of knocking intensity signals, to which filter said peak hold signal is applied.

7. An engine knocking meter comprising:
a first means for detecting a combustion pressure signal based on pressure in a cylinder of an engine, said first means comprising pressure sensors mounted one for each of the cylinders of the engine for detecting the combustion pressure signals for the individual cylinders;
a summing means for summing said pressure signals from said pressure sensors on a time axis and producing sum signals;
a second means for supplying those frequency components of said sum signals which correspond to a predetermined frequency band of an engine knocking signal as a pressure signal;
a crank angle sensor comprising at least two portions mounted on a crank shaft of said engine and a pickup means operatively associated with said two portions for detecting crank angle corresponding to the beginning and termination of the knocking region and producing two detecting signals timed to coincide with said crank angle in an ignition cycle of the cylinders of said engine and at least one portion mounted on a crank shaft of the engine for detecting a predetermined crank angle position between two knocking regions in each of the cylinders of the engine and producing a reset signal;
a third means for producing a gate signal based on said two detection signals from said crank angle sensor;
a gating means responsive to said sum signal from said second means and said gate signal from said third means to gate only those sum signal which occur during the presence of said gate signal;
a peak holding circuit for holding a peak value of a signal from said gating means for a predetermined duration, said peak holding circuit being reset by said reset signal; and
a fifth means for detecting a knocking state from said peak value.

8. An engine knocking meter according to claim 7 further comprises:
amplitude adjusting means for adjusting amplitudes of the pressure signals from the respective pressure sensors to compensate for the variance in the sensitivities of the respective pressure sensors; and
a selector switching means for selectively supplying the pressure signals individually for each of the cylinders or supplying a total sum of the pressure signals.

9. An engine knocking meter according to claim 8 wherein said pickup means of said crank angle sensor is an electromagnetic pickup and said at least two portions are pins of magnetic material attached to a crank angle disc rotating in synchronism with a crank shaft of said engine at predetermined crank angle positions from a top dead center in an ignition cycle of a cylinder with a predetermined crank angle interval, said crank angle sensor further comprises at least one pin of magnetic material attached to said crank angle disc at a predetermined crank angle position between that of a pin corresponding to the termination of a knocking region and that of a pin corresponding to the beginning of a knocking region and said third means comprises a shaping circuit and a counter circuit for producing a gate signal having a predetermined crank angle duration and a reset signal to be supplied to said peak holding circuit from three detection signals produced in said crank angle sensor.

10. An engine knocking meter according to claim 9 wherein said first means comprises piezoelectric elements attached to spark plugs mounted to each cylinder of said engine for detecting pressures in corresponding cylinders during combustion and producing pressure signals, said second means comprises a band pass filter circuit for eliminating those frequency components of the signal from said amplifier circuit which do not lie in a predetermined frequency band, and said fifth means comprises means for detecting knocking intensity which comprises a low pass filter for adjusting the time-constant of the signal from the peak holding circuit and an analog detector for indicating the signal from the low pass filter as knocking intensity and means for detecting the frequency of the knocking which comprises a level discriminating means for detecting the peak hold signal above a predetermined level as a knocking signal, AND gate for producing the pulse signals the number of which corresponds to the number of times of the occurence of knocking, a counter for counting up the pulse signals and an indication unit for indicating the frequency of the knocking signals during a given number of ignition cycles.

11. An engine knocking meter according to claim 8 wherein said at least two pins are attached to said crank angle disc at crank angles of 10° and 30° from the top dead center in the ignition cycle of each cyclinder of the engine and said at least one pin is attached to said crank angle disc at an angle of 80° from the top dead center in the ignition cycle of each cylinder of the engine.

* * * * *